US012291041B2

(12) United States Patent
Ishihara et al.

(10) Patent No.: US 12,291,041 B2
(45) Date of Patent: May 6, 2025

(54) INKJET PRINTER THAT PROVIDES UNEVEN TEXTURE ON PRINTED MATTER

(71) Applicant: Roland DG Corporation, Hamamatsu (JP)

(72) Inventors: Masanori Ishihara, Hamamatsu (JP); Takeshi Yagi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 104 days.

(21) Appl. No.: 18/089,699

(22) Filed: Dec. 28, 2022

(65) Prior Publication Data

US 2023/0158810 A1 May 25, 2023

Related U.S. Application Data

(63) Continuation of application No. PCT/JP2021/021010, filed on Jun. 2, 2021.

(30) Foreign Application Priority Data

Jun. 29, 2020 (JP) ................................ 2020-111276

(51) Int. Cl.
*B41J 2/21* (2006.01)
*B41J 11/00* (2006.01)
*B41J 2/01* (2006.01)

(52) U.S. Cl.
CPC ........ *B41J 2/2114* (2013.01); *B41J 11/00212* (2021.01); *B41J 11/00218* (2021.01); *B41J 2/01* (2013.01); *B41J 2/2117* (2013.01); *B41J 11/00214* (2021.01)

(58) Field of Classification Search
CPC ................ B41J 2/2114; B41J 11/00212; B41J 11/00218; B41J 2/2117; B41J 2/01; B41J 11/00214
See application file for complete search history.

(56) References Cited

U.S. PATENT DOCUMENTS

2005/0046684 A1 3/2005 Yoneyama
2011/0228023 A1 9/2011 Ozawa
(Continued)

FOREIGN PATENT DOCUMENTS

JP 2005-074878 A 3/2005
JP 2006015691 A 1/2006
(Continued)

OTHER PUBLICATIONS

Official Communication issued in International Patent Application No. PCT/JP2021/021010, mailed on Aug. 24, 2021.

*Primary Examiner* — Henok D Legesse
(74) *Attorney, Agent, or Firm* — Keating & Bennett, LLP

(57) ABSTRACT

An inkjet printer includes an ink head, a carriage, and a first discharge controller. The ink head discharges photo-curable ink onto a recording medium. The ink head includes a colored ink nozzle group to discharge colored photo-curable ink, and a transparent ink nozzle group to discharge transparent photo-curable ink. The carriage is equipped with the ink head. The first discharge controller is configured or programmed to, when either one of the carriage and the recording medium makes a single movement, cause the colored ink nozzle group and the transparent ink nozzle group to discharge the colored photo-curable ink and the transparent photo-curable ink, respectively, onto a predetermined region so as to form a colored image and a texture image. The texture image includes the colored photo-curable ink and the transparent photo-curable ink that overlap with each other.

8 Claims, 9 Drawing Sheets

(56) References Cited

U.S. PATENT DOCUMENTS

| | | | | |
|---|---|---|---|---|
| 2014/0192113 | A1* | 7/2014 | Ozawa | B41J 2/2114 347/21 |
| 2016/0297210 | A1 | 10/2016 | Klemann et al. | |
| 2017/0050449 | A1 | 2/2017 | Ikeda et al. | |
| 2017/0129256 | A1 | 5/2017 | Tabayashi | |
| 2018/0043680 | A1 | 2/2018 | Ochi | |
| 2018/0043720 | A1 | 2/2018 | Kasahara | |
| 2018/0326746 | A1 | 11/2018 | Nariyama | |
| 2019/0061374 | A1 | 2/2019 | Kanai | |

FOREIGN PATENT DOCUMENTS

| | | | | |
|---|---|---|---|---|
| JP | 2010125798 | A | 6/2010 | |
| JP | 2010-162801 | A | 7/2010 | |
| JP | 2011-161824 | A | 8/2011 | |
| JP | 2011-194646 | A | 10/2011 | |
| JP | 2013086447 | A | 5/2013 | |
| JP | 2014-028446 | A | 2/2014 | |
| JP | 2014-037086 | A | 2/2014 | |
| JP | 2014159177 | A | 9/2014 | |
| JP | 2015-214133 | A | 12/2015 | |
| JP | 2017-001288 | A | 1/2017 | |
| JP | 2017001288 | * | 1/2017 | B41J 2/01 |
| JP | 2018-001674 | A | 1/2018 | |
| JP | 2018-024164 | A | 2/2018 | |
| JP | 2018024216 | A | 2/2018 | |
| JP | 2018052044 | A | 4/2018 | |
| JP | 2018187931 | A | 11/2018 | |
| JP | 2019042931 | A | 3/2019 | |
| WO | 2015/194566 | A1 | 12/2015 | |

* cited by examiner

INKJET PRINTER THAT PROVIDES UNEVEN TEXTURE ON PRINTED MATTER

CROSS REFERENCE TO RELATED APPLICATIONS

This application claims the benefit of priority to Japanese Patent Application No. 2020-111276 filed on Jun. 29, 2020 and is a Continuation Application of PCT Application No. PCT/JP2021/021010 filed on Jun. 2, 2021. The entire contents of each application are hereby incorporated herein by reference.

BACKGROUND OF THE INVENTION

1. Field of the Invention

The present invention relates generally to inkjet printers, and more particularly to an inkjet printer using photo-curable ink.

2. Description of the Related Art

Inkjet printers to print desired images on recording media by inkjet printing methods are known in the related art. JP 2011-161824 A, for example, discloses an inkjet printer including a first ink head to discharge colored ultraviolet-curable ink (hereinafter referred to as "colored ink"), a second ink head to discharge transparent ultraviolet-curable ink (hereinafter referred to as "clear ink"), an ultraviolet light applicator to apply ultraviolet light to the ultraviolet-curable ink discharged onto a recording medium, a carriage equipped with the first ink head, the second ink head, and the ultraviolet light applicator and movable in a main scanning direction, and a conveyor to convey the recording medium in a feeding direction.

JP 2011-161824 A discloses a layer printing technique involving discharging the colored ink from a first discharging region of the first ink head located on a rear side in the feeding direction so as to form a colored image on a surface of the recording medium, then conveying the recording medium in the feeding direction, and subsequently discharging the clear ink from a second discharging region of the second ink head located on a front side in the feeding direction so as to form a clear image (which has an uneven surface) in a linear pattern on the colored image. JP 2011-161824 A suggests that such layer printing changes the appearance of the colored image so as to decorate the colored image.

SUMMARY OF THE INVENTION

As described in JP 2011-161824 A, the technique known in the related art involves separately and sequentially performing the step of forming a colored image by using colored ink and the step of forming a clear image by using clear ink. When a colored image and a clear image are to be formed separately, however, the time required for printing will increase, resulting in a lower printing throughput. Forming a clear image having an uneven surface on a colored image enables expression of a texture of a printed matter, which includes, for example, making a visual change to the printed matter or causing the printed matter to provide a tactile sensation. Forming a clear image on a colored image, however, may give different glosses (e.g., different optical reflectances) to a portion where the clear image is formed and a portion where no clear image is formed (e.g., a portion where the colored image is exposed). This may unfortunately cause a user to feel strange about the appearance of the resulting printed matter.

Accordingly, preferred embodiments of the present invention provide new inkjet printers that are each able to prevent or minimize decreases in printing throughput and to prevent or reduce differences in gloss so as to provide printed matters that make users feel less strange about the appearances of the printed matters while maintaining uneven textures of the printed matters.

An inkjet printer according to a preferred embodiment of the present invention includes an ink head including nozzles to discharge photo-curable ink onto a recording medium, a light applicator to apply light to the photo-curable ink discharged onto the recording medium, a carriage equipped with the ink head, a mover to move either one of the carriage and the recording medium relative to the other one of the carriage and the recording medium in a first direction, and a controller to control the ink head, the light applicator, and the mover. The nozzles include first nozzles to discharge colored photo-curable ink, and second nozzles to discharge transparent photo-curable ink. The ink head includes a colored ink nozzle group in which the first nozzles are provided along a second direction perpendicular or substantially perpendicular to the first direction, and a transparent ink nozzle group in which the second nozzles are provided along the second direction. The controller includes a first discharge controller configured or programmed to, when either one of the carriage and the recording medium makes a single movement from one side to the other side in the first direction, cause the colored ink nozzle group to discharge the colored photo-curable ink onto a predetermined region while causing the transparent ink nozzle group to discharge the transparent photo-curable ink onto the predetermined region so as to form a colored image and a texture image. The texture image includes the colored photo-curable ink and the transparent photo-curable ink that overlap with each other.

An inkjet printer according to another preferred embodiment of the present invention includes an ink head including nozzles to discharge photo-curable ink onto a recording medium, a light applicator to apply light to the photo-curable ink discharged onto the recording medium, a carriage equipped with the ink head, a mover to move either one of the carriage and the recording medium relative to the other one of the carriage and the recording medium in a first direction, and a controller to control the ink head, the light applicator, and the mover. The nozzles include first nozzles to discharge colored photo-curable ink, and second nozzles to discharge transparent photo-curable ink. The ink head includes a colored ink nozzle group in which the first nozzles are provided along a second direction perpendicular or substantially perpendicular to the first direction, and a transparent ink nozzle group in which the second nozzles are provided along the second direction. The controller includes a print signal receiver to receive colored ink print data for discharge of the colored photo-curable ink and transparent ink print data for discharge of the transparent photo-curable ink, and a first discharge controller configured or programmed to, when either one of the carriage and the recording medium makes a single movement from one side to the other side in the first direction, cause the colored ink nozzle group to discharge the colored photo-curable ink onto a predetermined region in accordance with the colored ink print data while causing the transparent ink nozzle group to discharge the transparent photo-curable ink onto the predetermined region in accordance with the transparent ink print data such that at least some of the colored photo-curable ink overlaps with the transparent photo-curable ink.

The inkjet printers according to the above preferred embodiments each discharge colored photo-curable ink and transparent photo-curable ink in a single round of scanning (i.e., when either one of the carriage and the recording medium makes a single movement from one side to the other side in the first direction relative to the other one of the carriage and the recording medium). Thus, the inkjet printers according to the above preferred embodiments are each able to make the time required for printing shorter and prevent or minimize a decrease in printing throughput to a higher degree than an inkjet printer that discharges colored photo-curable ink and transparent photo-curable ink in different rounds of scanning. The inkjet printers according to the above preferred embodiments each discharge colored photo-curable ink and transparent photo-curable ink onto a predetermined region on the recording medium so as to form an image including the colored photo-curable ink and the transparent photo-curable ink that overlap with each other. In one example, the inkjet printers according to the above preferred embodiments each form not only a colored image including colored photo-curable ink but also a texture image including colored photo-curable ink and transparent photo-curable ink that overlap with each other. Accordingly, unlike layer printing involving forming a clear image on a colored image (which is disclosed, for example, in JP 2011-161824 A), the inkjet printers according to the above preferred embodiments are each able to reduce differences in surface gloss that are caused by an unclear boundary between a region where transparent photo-curable ink is provided and a region where no transparent photo-curable ink is provided. Consequently, the inkjet printers according to the above preferred embodiments are able to prevent or reduce differences in gloss so as to provide printed matters that make users feel less strange about the appearances of the printed matters while maintaining uneven textures of the printed matters.

Various preferred embodiments of the present invention provide inkjet printers that are each able to prevent or minimize decreases in printing throughput and to prevent or reduce differences in gloss so as to provide printed matters that make users feel less strange about the appearances of the printed matters while maintaining uneven textures of the printed matters.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Inkjet printers according to preferred embodiments of the present invention will be described below with reference to the drawings. The preferred embodiments described below are naturally not intended to limit the present invention in any way. Components and elements having the same functions are identified by the same reference signs, and description thereof will be simplified or omitted when deemed redundant.

As used herein, the term "inkjet printer" refers to any of various printers that use inkjet printing methods known in the related art, such as continuous methods (e.g., a binary deflection method and a continuous deflection method) and various on-demand methods (e.g., a thermal method and a piezoelectric method). The term "printer" includes, but is not limited to, a two-dimensional (2D) printer to print a two-dimensional image and a three-dimensional (3D) printer (e.g., a three-dimensional printing apparatus) to print a three-dimensional object.

Figure 1:
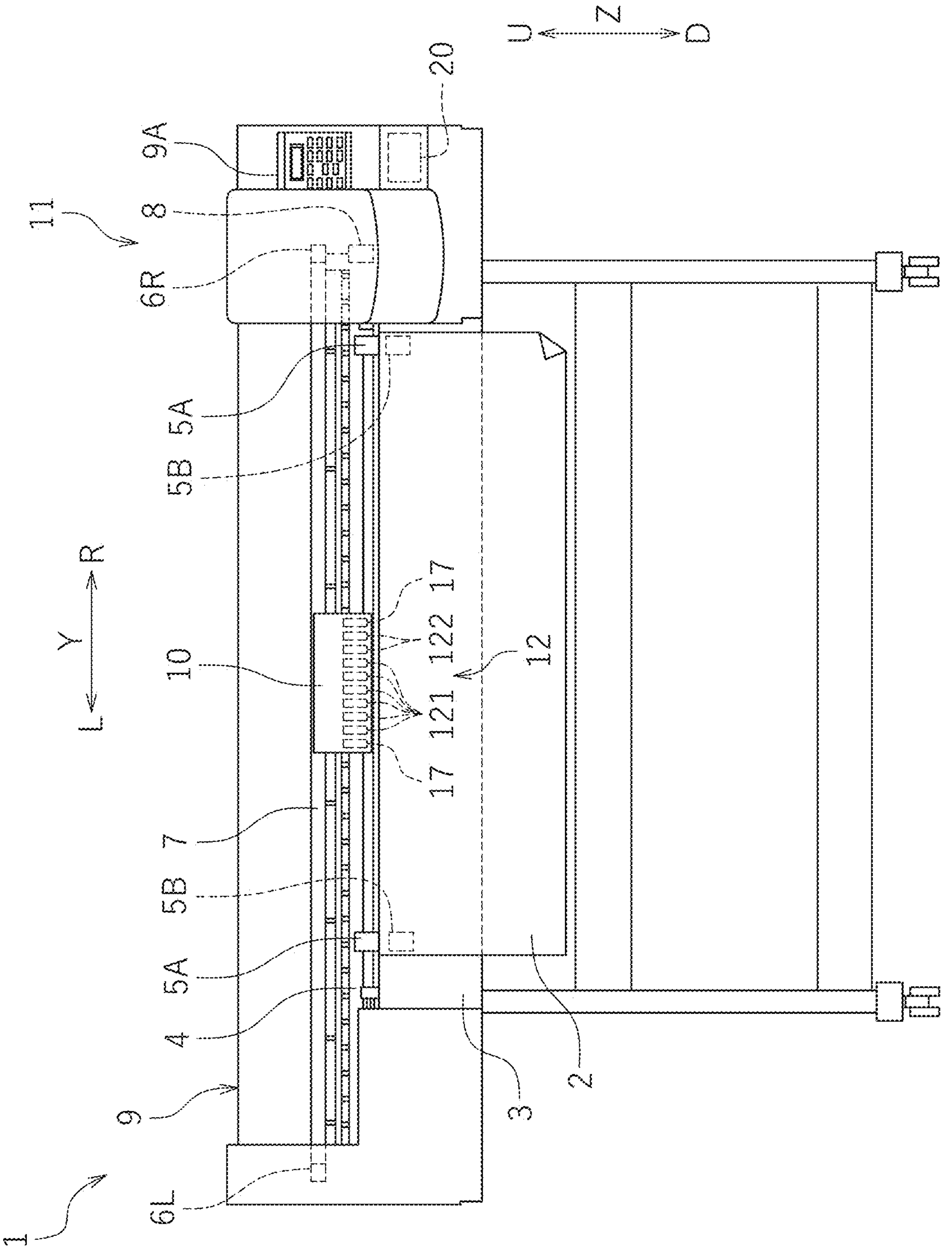
FIG. 1 is a front view of an inkjet printer according to a preferred embodiment of the present invention.

FIG. 1 is a front view of an inkjet printer 1 (which may hereinafter be simply referred to as a "printer 1"). The printer 1 is a 2D printer. In the following description, the terms "left", "right", "up", and "down" respectively refer to left, right, up, and down with respect to a user (i.e., a person who uses the printer 1) facing the front of the printer 1. A direction away from the rear of the printer 1 and toward the user is a forward direction, and a direction away from the user and toward the rear of the printer 1 is a rearward direction. The reference signs F, Rr, L, R, U, and D in the drawings respectively represent front, rear, left, right, up, and down. The reference sign X in the drawings represents a sub-scanning direction (which corresponds to a front-rear direction). The reference sign Y in the drawings represents a main scanning direction (which corresponds to a right-left direction). The reference sign Z in the drawings represents an up-down direction. The main scanning direction Y is an example of a first direction. The sub-scanning direction X is an example of a second direction perpendicular or substantially perpendicular to the first direction. The up-down direction Z is an example of a direction of thickness of a recording medium 2 and an image formed thereon. These directions, however, are defined merely for the sake of convenience of description and do not limit in any way how the printer 1 may be installed.

The printer 1 is a large printer to print images on the recording medium 2 of a large-format type. The recording medium 2 is an object on which images are to be printed. In the present preferred embodiment, the recording medium 2 is a medium in a roll form, which is, for example, "a roll of paper". Alternatively, the recording medium 2 may be in any form other than a roll form. A material for the recording medium 2 is not limited to any particular material. The recording medium 2 may typically be paper, such as plain paper or inkjet printing paper. Other examples of materials for the recording medium 2 include sheets made of resins, such as polyvinyl chloride (PVC), polyethylene terephthalate, and polyester; plates made of various materials, such as aluminum, iron, stainless steel, wood, glass, and rubber; fabrics, such as a woven fabric and a nonwoven fabric; and leather. The recording medium 2 may be any medium made of material(s) other than those just mentioned. As used herein, the term "image" refers to any layer(s) formed on and/or over the recording medium 2 by using ink. Examples of images include a character, a numeral, a symbol, a figure, a design, a pattern, and a solid fill.

As illustrated in FIG. 1, the printer 1 includes a platen 3, a guide rail 4, a casing 9, a carriage 10, a carriage mover 11, an ink head 12, ultraviolet (UV) lamps 17, and a controller 20. The casing 9 serves as a housing of the printer 1. The casing 9 extends in the main scanning direction Y. The right end of the casing 9 is provided with an operation panel 9A. The operation panel 9A is equipped with a display to present information, such as an operating status, and input elements, such as keys to be operated by the user.

The platen 3 supports the recording medium 2 during printing. The platen 3 is provided inside the casing 9. The platen 3 extends in the main scanning direction Y. The platen 3 is disposed below the guide rail 4. At least a portion of the platen 3 is disposed in parallel or substantially in parallel with the guide rail 4. The platen 3 is disposed below the carriage 10. The recording medium 2 is placed on the platen 3. Pinch rollers 5A are provided above the platen 3. The pinch rollers 5A press the recording medium 2 from above. Grit rollers 5B are provided in the platen 3 such that the grit rollers 5B each face an associated one of the pinch rollers 5A. The grit rollers 5B are connected to a feed motor 5C (see FIG. 4).

The feed motor 5C is electrically connected to the controller 20 and is thus controlled by the controller 20. The grit rollers 5B are rotatable upon receiving a driving force from the feed motor 5C. With the recording medium 2 held between each pinch roller 5A and the associated grit roller 5B, rotation of the grit rollers 5B conveys the recording medium 2 in the sub-scanning direction X (which corresponds to the front-rear direction in FIG. 1). In the present preferred embodiment, the pinch rollers 5A, the grit rollers 5B, and the feed motor 5C function as a conveyor to move the recording medium 2 in the sub-scanning direction X. The conveyor just described is given by way of example only. The conveyor is not limited to any particular configuration, structure, or arrangement.

The guide rail 4 is provided in the casing 9. The guide rail 4 extends in the main scanning direction Y. The guide rail 4 is disposed above the platen 3. The carriage 10 is in slidable engagement with the guide rail 4. The carriage 10 is disposed inside the casing 9. The carriage 10 is equipped with the ink head 12 and the UV lamps 17 (which will be described below). The carriage mover 11 moves the carriage 10 in the main scanning direction Y.

The carriage mover 11 includes a pulley 6L disposed on the left of the guide rail 4, a pulley 6R disposed on the right of the guide rail 4, an endless belt 7 wound around the pulleys 6L and 6R, and a carriage motor 8 connected to the pulley 6R. The carriage 10 is secured to the belt 7. The carriage motor 8 is electrically connected to the controller 20 and is thus controlled by the controller 20. Driving the carriage motor 8 rotates the pulley 6R, causing the belt 7 to run. The carriage 10 thus moves along the guide rail 4 in the main scanning direction Y (i.e., the right-left direction in FIG. 1) together with the ink head 12 and the UV lamp 17 mounted on the carriage 10. The main scanning direction Y includes a first scanning direction and a second scanning direction opposite to the first scanning direction. The first scanning direction extends from a first side to a second side in the main scanning direction Y (i.e., from left to right in FIG. 1). The second scanning direction extends from the second side to the first side in the main scanning direction Y (i.e., from right to left in FIG. 1). Accordingly, the carriage 10 moves in the first scanning direction and the second scanning direction. The carriage mover 11 is an example of a mover to move the carriage 10 in the main scanning direction Y. The mover just described is given by way of example only. The carriage mover 11 is not limited to any particular configuration, structure, or arrangement.

Figure 2:
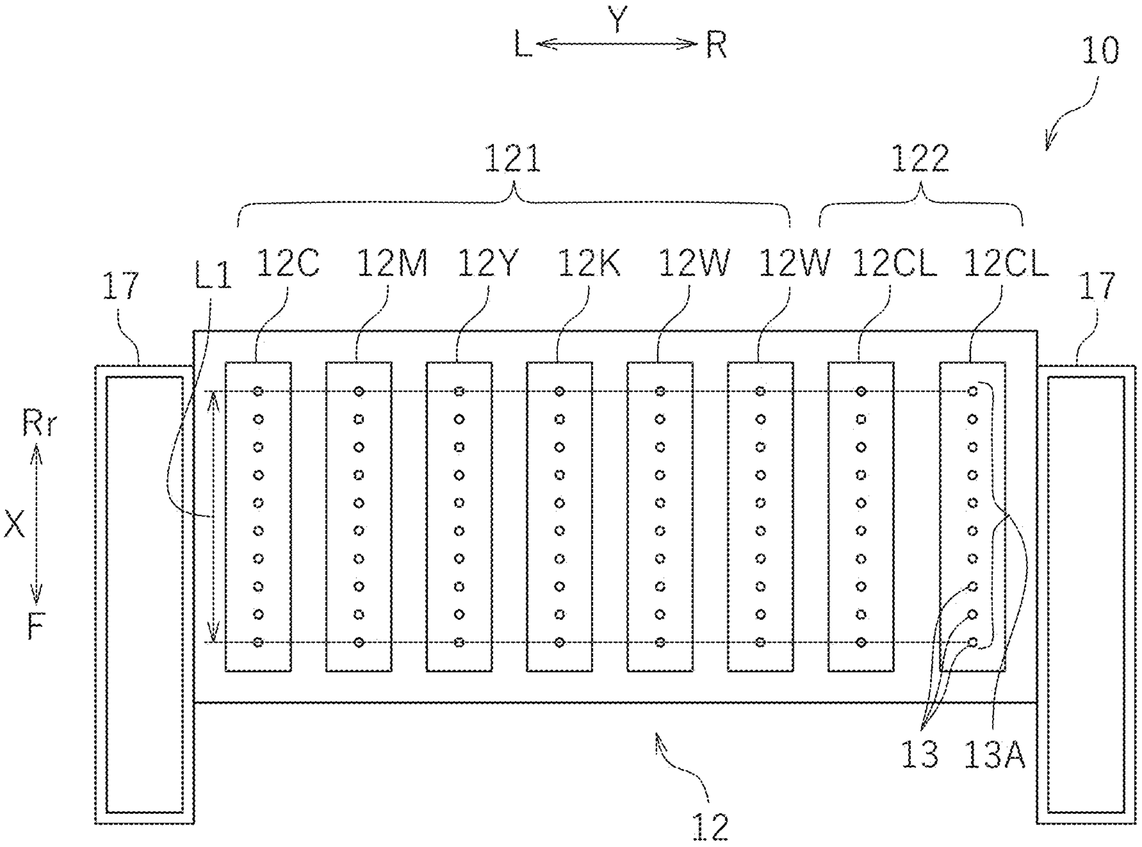
FIG. 2 is a bottom view of a carriage.

FIG. 2 is a bottom view of the carriage 10. As illustrated in FIG. 2, the carriage 10 is provided with the ink head 12 and the UV lamps 17. In the present preferred embodiment, the number of UV lamps 17 provided on the carriage 10 is two. The ink head 12 is disposed between the two UV lamps 17. One of the two UV lamps 17 is disposed leftward of the ink head 12. The other one of the two UV lamps 17 is disposed rightward of the ink head 12. Accordingly, the printer 1 is able to effect bidirectional printing. The location of the ink head 12 in the present preferred embodiment is described by way of example only. The ink head 12 may be disposed at any other suitable location. The locations of the UV lamps 17 in the present preferred embodiment are described by way of example only. The UV lamps 17 may be disposed at any other suitable locations.

The ink head 12 discharges photo-curable ink onto the recording medium 2 so as to form ink dots 31 and 32 (see FIG. 7) on the recording medium 2. As illustrated in FIG. 1, the ink head 12 is disposed above the platen 3. The ink head 12 faces the recording medium 2. The ink head 12 is in slidable engagement with the guide rail 4 through the carriage 10. The ink head 12 includes a first sub-head 121 to discharge colored photo-curable ink (which may hereinafter be simply referred to as "colored ink"), and a second sub-head 122 to discharge transparent photo-curable ink (which may hereinafter be simply referred to as "clear ink"). The first sub-head 121 and the second sub-head 122 are disposed side by side in the main scanning direction Y. In the present preferred embodiment, the first sub-head 121 and the second sub-head 122 are mounted on the same carriage 10. The first sub-head 121 and the second sub-head 122, however, do not necessarily have to be mounted on the same carriage 10. Alternatively, the first sub-head 121 and the second sub-head 122 may be mounted on different carriages.

As used herein, the term "clear ink" refers to ink containing no colorant (which is a component that absorbs light of a wavelength in a visible light range) or ink having a colorant content insufficient for a coloring purpose (which is, for example, equal to or lower than about 0.1 percent of the total mass of colorant-containing ink). As used herein, the term "colored ink" refers to any type of ink other than clear ink. The term "colored ink" typically refers to any type of colorant-containing ink.

The first sub-head 121 discharges colorant-containing colored ink CO (see FIG. 3), examples of which include color ink and metallic ink. The printer 1 is thus able to print a colored image 42 and a texture image 44 (see FIG. 6). In the present preferred embodiment, the first sub-head 121 includes a head portion 12C to discharge cyan ink (C), a head portion 12M to discharge magenta ink (M), a head portion 12Y to discharge yellow ink (Y), a head portion 12K to discharge black ink (K), and two head portions 12W to discharge white ink (W). Four of these head portions, i.e., the head portions 12C, 12M, 12Y, and 12K, each discharge process color ink.

Six of the head portions, i.e., the head portions 12C, 12M, 12Y, 12K, and 12W, are arranged side by side in the main scanning direction Y. The number of head portions included in the first sub-head 121 in the present preferred embodiment is given by way of example only. The first sub-head 121 may include any other suitable number of head portions. The types of colored ink in the present preferred embodiment are given by way of example only. The head portions of the first sub-head 121 may each discharge any other suitable type of colored ink. In one example, the head portions of the first sub-head 121 may discharge ink of light colors, such as light cyan, light magenta, light yellow, and light black. In another example, the head portions of the first sub-head 121 may discharge metallic ink containing metallic pigments, such as silver and gold pigments. In still another example, the number of head portions 12W to discharge white ink may be one or may be three or more. In yet another example, the first sub-head 121 may include no head portion 12W. Six of the head portions, i.e., the head portions 12C, 12M, 12Y, 12K, and 12W, are each connected to an associated one of ink tanks (not illustrated) storing the colored ink CO.

The second sub-head 122 discharges clear ink, e.g., gloss ink to give a gloss to a surface of an image and/or preprocessing primer ink to form an underlying layer or a lining for an image. The printer 1 is thus able to print the texture image 44 (see FIG. 6). In the present preferred embodiment, the second sub-head 122 includes two head portions 12CL to discharge gloss ink. The two head portions 12CL are arranged side by side in the main scanning direction Y. The number of head portions included in the second sub-head 122 in the present preferred embodiment is given by way of example only. The second sub-head 122 may include any other suitable number of head portions. The number of head portions included in the second sub-head 122 may be one or may be three or more. The two head portions 12CL are each connected to an associated one of ink tanks (not illustrated) storing clear ink.

The locations of the first sub-head 121 and the second sub-head 122 in the present preferred embodiment are given by way of example only. The first sub-head 121 and the second sub-head 122 may be located at any other suitable locations. The ink head 12 may include more than one first sub-head 121 and/or more than one second sub-head 122. In one example, the second sub-head 122 may be disposed between more than one first sub-head 121 in the main scanning direction Y. In another example, at least one second sub-head 122 may be disposed on each side of the first sub-head 121. More specifically, the head portions 12CL may each be disposed between any two of the head portions 12C, 12M, 12Y, 12K, and 12W in the main scanning direction Y, or at least one head portion 12CL may be disposed on each side of any of the head portions 12C, 12M, 12Y, 12K, and 12W.

The first sub-head 121 and the second sub-head 122 each discharge photo-curable ink. The photo-curable ink cures upon being exposed to light. The photo-curable ink typically contains a photopolymerization compound, a photopolymerization initiator, and an organic solvent. When necessary, the photo-curable ink may contain various other additives. Examples of the additives may include a colorant (such as a pigment or a dye), a photosensitizer, a polymerization inhibitor, an ultraviolet light absorber, an antioxidant, a plasticizer, a surfactant, a leveling agent, a thickener, a disperser, an antifoaming agent, and an antiseptic. As used herein, the term "photo-curable ink" refers to ultraviolet-curable ink (which may be referred to as "UV ink") that cures upon being exposed to ultraviolet light of a wavelength of between about 10 nm and about 400 nm, for example.

In one preferred mode, the colored ink CO and clear ink contain similar photopolymerization compounds. The colored ink CO and clear ink preferably each contain, for example, a (meth) acrylate monomer including a (meth) acryloyl group. As used herein, the term "(meth) acryloyl" subsumes "methacryloyl" and "acryloyl". In another preferred mode, the colored ink CO and clear ink contain similar organic solvents. The colored ink CO and clear ink preferably each contain, for example, an aliphatic hydrocarbon, such as n-hexane. Although described below in more detail, the printer 1 according to the present preferred embodiment cures the colored ink CO and clear ink, with the dots 31 (see FIG. 7) of the colored ink CO and the dots 32 (see FIG. 7) of clear ink mixed at least in the main scanning direction Y on the recording medium 2. Using the colored ink CO and clear ink containing similar compounds (e.g., using the colored ink CO and clear ink each containing at least either a photopolymerization compound or an organic solvent) increases an affinity between the colored ink CO and clear ink, which facilitates fixing the colored ink CO and clear ink together onto the recording medium 2.

As illustrated in FIG. 2, the head portions 12C, 12M, 12Y, 12K, 12W, and 12CL each include, at its surface that faces the recording medium 2 (i.e., its lower surface in the present preferred embodiment), a plurality of nozzles 13 to discharge photo-curable ink. In the present preferred embodiment, the head portions 12C, 12M, 12Y, 12K, 12W, and 12CL include equal numbers of nozzles 13. Alternatively, some or all of the head portions 12C, 12M, 12Y, 12K, 12W, and 12CL may have different numbers of nozzles 13. The nozzles 13 are arranged at predetermined pitches (e.g., at pitches of 360 dpi) corresponding to the densities of the dots 31 and 32 (see FIG. 7) to be formed on the recording medium 2. The nozzles 13 of the head portions 12C, 12M, 12Y, 12K, 12W, and 12CL are all arranged at equal pitches.

In the present preferred embodiment, the nozzles 13 of the head portions 12C, 12M, 12Y, 12K, 12W, and 12CL are all equal in diameter. Alternatively, the nozzles 13 of the head portions 12C, 12M, 12Y, 12K, and 12W may be equal in diameter to or different in diameter from the nozzles 13 of the head portions 12CL. In one example, the nozzles 13 of the head portions 12CL may be larger in diameter than the nozzles 13 of the head portions 12C, 12M, 12Y, 12K, and 12W.

In the present preferred embodiment, the head portions 12C, 12M, 12Y, 12K, 12W, and 12CL are disposed at corresponding positions in the sub-scanning direction X. The nozzles 13 of the head portions 12C, 12M, 12Y, 12K, and 12W and the nozzles 13 of the head portions 12CL are disposed at corresponding positions in the sub-scanning direction X. The head portions 12C, 12M, 12Y, 12K, 12W, and 12CL each include a nozzle row 13A. The nozzle rows 13A each include the nozzles 13 arranged along a length L1 in the sub-scanning direction X. The nozzle row 13A included in each of the head portions 12C, 12M, 12Y, 12K, and 12W is an example of a colored ink nozzle group. The nozzle row 13A included in each of the head portions 12CL is an example of a transparent ink nozzle group.

In the present preferred embodiment, the number of nozzle rows 13A included in each of the four head portions 12C, 12M, 12Y, and 12K, which discharges ink of one of process colors, is one. The number of nozzle rows 13A included in the head portions 12W, which discharge white ink, is greater than the number of nozzle rows 13A included in each of the head portions 12C, 12M, 12Y, and 12K. In the present preferred embodiment, the number of nozzle rows 13A included in the head portions 12W is two. The number of nozzle rows 13A included in the head portions 12CL, which discharge clear ink, is greater than the number of nozzle rows 13A included in each of the head portions 12C, 12M, 12Y, and 12K. In the present preferred embodiment, the number of nozzle rows 13A included in the head portions 12CL is two. The number of nozzle rows 13A included in the head portions 12CL, which discharge clear ink, is equal to the number of nozzle rows 13A included in the head portions 12W, which discharge white ink. Each process color is an example of a first color. The nozzle row 13A included in each of the head portions 12C, 12M, 12Y, and 12K is an example of a first colored ink nozzle group.

The nozzle rows 13A of the head portions 12C, 12M, 12Y, 12K, 12W, and 12CL are disposed along the same length L1 in the sub-scanning direction X. The length L1 is a length measured between the center of a foremost one of the nozzles 13 in the sub-scanning direction X and the center of a rearmost one of the nozzles 13 in the sub-scanning direction X. In the present preferred embodiment, the nozzles 13 of each of the head portions 12C, 12M, 12Y, 12K, 12W, and 12CL are disposed in a line in the sub-scanning direction X so as to define the nozzle row 13A along the length L1. Any suitable number of nozzles 13 may be located at any suitable locations in each nozzle row 13A. In one example, the nozzles 13 of each nozzle row 13A may be disposed in a staggered arrangement.

Figure 3:
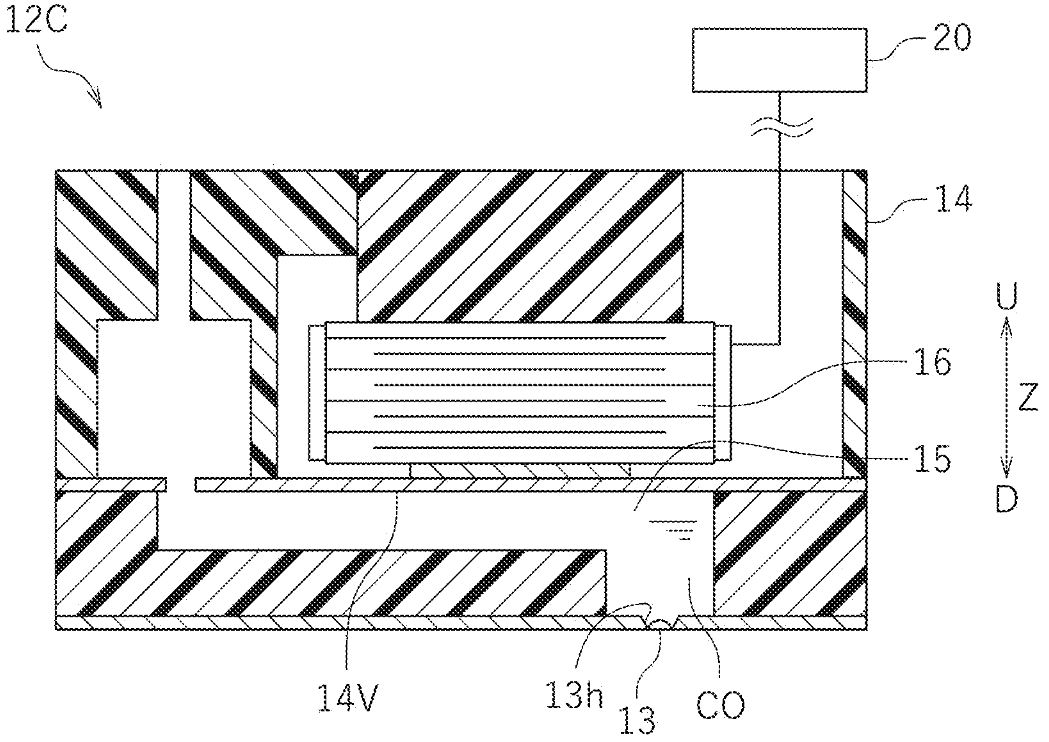
FIG. 3 is a partial vertical cross-sectional view of a head portion.

FIG. 3 is a partial vertical cross-sectional view of the head portion 12C. Specifically, FIG. 3 is a vertical cross-sectional view of the head portion 12C cut through the center of one of the nozzles 13 of the head portion 12C. As illustrated in FIG. 3, the head portion 12C includes a hollow case body 14, a pressure chamber 15 which is defined in the case body 14 and in which a predetermined amount of the colored ink CO is stored, and an actuator 16 to pressurize the colored ink CO inside the pressure chamber 15. A surface of the pressure chamber 15 (which is the lower surface of the pressure chamber 15 in FIG. 3) is provided with nozzle holes 13*h* passing through the surface of the pressure chamber 15 in the up-down direction Z. The pressure chamber 15 is in communication with the nozzles 13 through the nozzle holes 13*h*.

The actuator 16 includes a piezoelectric element. The actuator 16 is connected to a diaphragm 14V defining a portion of the pressure chamber 15. The actuator 16 is electrically connected to the controller 20 and is thus controlled by the controller 20. The controller 20 supplies a pulse waveform (or driving pulses) to the actuator 16 so as to cause the head portion 12C to discharge a predetermined amount of ink. The actuator 16 shrinks or elongates in accordance with the waveform of the driving pulses. The shrinkage or elongation of the actuator 16 deflects the diaphragm 14V so as to cause the pressure chamber 15 to expand or contract. The contraction of the pressure chamber 15 pressurizes the colored ink CO inside the pressure chamber 15. Pressurizing the colored ink CO inside the pressure chamber 15 causes the colored ink CO to be discharged from the nozzles 13. The above description of the head portion 12C has been given by way of example. The other head portions (i.e., the head portions 12M, 12Y, 12K, 12W, and 12CL) may each be similar in structure to the head portion 12C.

The UV lamps 17 apply ultraviolet light to photo-curable ink discharged onto the recording medium 2. As illustrated in FIG. 1, the UV lamps 17 are disposed above the platen 3. The UV lamps 17 are in slidable engagement with the guide rail 4 through the carriage 10. The UV lamps 17 each apply light of an ultraviolet wavelength that is able to cure photo-curable ink. In one example, the UV lamps 17 may each be a light-emitting diode (LED). In another example, the UV lamps 17 may each be a fluorescent lamp (which is a low-pressure mercury lamp) or a high-pressure mercury lamp. Each of the UV lamps 17 is an example of a light applicator. The UV lamps 17 do not necessarily have to be mounted on the same carriage 10 as the ink head 12. In one example, the UV lamps 17 may be mounted on a carriage other than the carriage 10. In another example, the UV lamps 17 may each be attached to a portion of the casing 9, such as a wall surface of the casing 9. The UV lamps 17 are electrically connected to the controller 20 such that the UV lamps 17 are turned ON and OFF by the controller 20.

The controller 20 controls overall operations of the printer 1. As illustrated in FIG. 1, the controller 20 according to the present preferred embodiment is provided inside the casing 9. The controller 20 is, for example, a microcomputer. The controller 20, however, does not necessarily have to be provided inside the casing 9. Alternatively, the controller 20 may be, for example, a general-purpose personal computer disposed outside the casing 9 and communicably connected to the printer 1.

The controller 20 is not limited to any particular hardware configuration. The controller 20 includes, for example, an interface (I/F), a central processing unit (CPU), a read-only memory (ROM), a random-access memory (RAM), and a storage. The I/F receives data, such as print data, from an external device, such as a host computer. The CPU executes commands included in a control program. The ROM stores the program to be executed by the CPU. The RAM is used as a working area where the program is to be expanded. The storage (such as a memory) stores the program and various types of data.

Figure 4:
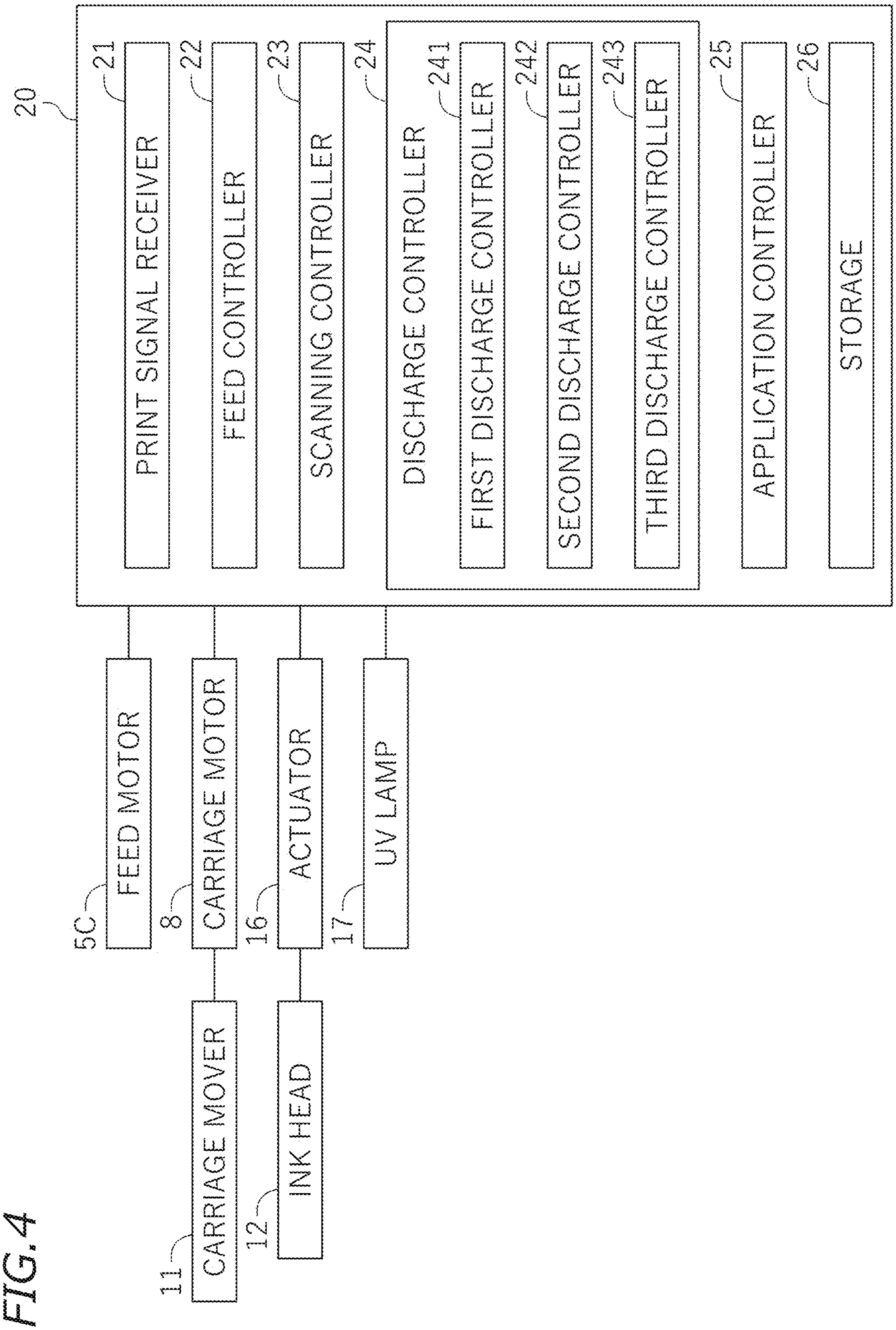
FIG. 4 is a functional block diagram illustrating a configuration of a controller.

FIG. 4 is a functional block diagram of the controller 20. The controller 20 is communicably connected to the feed motor 5C, the carriage motor 8 of the carriage mover 11, the actuators 16 of the ink head 12, and the UV lamps 17. The controller 20 is configured or programmed to be able to control the feed motor 5C, the carriage motor 8, the actuators 16, and the UV lamps 17. The controller 20 includes a print signal receiver 21, a feed controller 22, a scanning controller 23, a discharge controller 24, an application controller 25, and a storage 26. These components of the controller 20 are able to communicate with each other. The functions of these components of the controller 20 may be implemented by software or may be implemented by hardware. The functions of these components of the controller 20 may be performed by a single processor or a plurality of processors or may be incorporated into circuit(s).

Although described below in more detail, the controller 20 alternately repeats a conveying operation to be performed by the feed controller 22, and a printing operation (which corresponds to a pass) to be performed by the scanning controller 23, the discharge controller 24, and the application controller 25. Alternately repeating the conveying operation and the printing operation effects printing on the recording medium 2. The colored image 42 (see FIG. 6) and the texture image 44 (see FIG. 6) are thus formed on the recording medium 2. As used herein, the term "texture image" refers to an image formed on the recording medium 2 so as to be greater in irregularity (or surface roughness) than the colored image 42 formed by discharging only colored ink. Forming the texture image 44 on the recording medium 2 provides a texture to a surface of a printed matter 40 (see FIG. 6) or provides a texture to, for example, the recording medium 2 and/or the colored image 42.

As used herein, the term "printing operation" refers to an operation involving causing the ink head 12 to discharge photo-curable ink onto the recording medium 2 and causing the UV lamps 17 to apply ultraviolet light to the photo-curable ink discharged onto the recording medium 2, while moving the carriage 10 in the main scanning direction Y. As used herein, the term "single printing operation" refers to an operation involving a single movement of the carriage 10 from the first side to the second side in the main scanning direction Y (i.e., from left to right in FIG. 1) or a single movement of the carriage 10 from the second side to the first side in the main scanning direction Y (i.e., from right to left in FIG. 1).

The print signal receiver 21 receives print data and print setting information from an external device (not illustrated), such as a host computer. The print data represents image(s). Creating the print data involves creating image files in various formats by using, for example, a computer, and converting (or rasterizing) the image files into format(s), which is/are readable by the printer 1, by using a computer program, such as a raster image processor. The print data is, for example, raster format data. The print data associates each print region (e.g., each unit of pixels), which is included in a printable area, with information indicating what type of photo-curable ink is to be provided.

In the present preferred embodiment, the print data includes colored ink print data that defines a colored ink provided region where the colored ink CO is to be provided, and transparent ink print data that defines a clear ink provided region where clear ink is to be provided. The colored ink print data is used to form the colored image 42 (see FIG. 6) and the texture image 44 (see FIG. 6). The transparent ink print data is used to form the texture image 44. In one example, the colored ink print data and the transparent ink print data that are superposed on one another (or combined with each other) with reference to a printing start position may be transmitted from an external device. In another example, the colored ink print data and the transparent ink print data that are separate from and independent of each other may be individually transmitted from an external device.

The transparent ink print data may be freely selectable by the user from among a plurality of patterns prepared in advance. The transparent ink print data may be, for example, a regular pattern formed by repeating a design. The clear ink provided region defined by the transparent ink print data may be an entirety or a portion of a printable area. The locations of the clear ink provided region and the colored ink provided region on the recording medium 2 (i.e., the locations of the clear ink provided region and the colored ink provided region in a plan view) may overlap with each other or may not overlap with each other.

The print setting information includes ink discharge settings for print regions. The ink discharge settings may include, for example, at least one of the following pieces of information the fluid volume of ink to be discharged from the nozzles 13 per unit area of the recording medium 2, the dimensions of the dots 31 and 32 (see FIG. 7) to be formed, e.g., the sizes and thicknesses of the dots 31 and 32 in a plan view, and the formation densities of the dots 31 and 32.

The dots 32 (see FIG. 7) of clear ink may be set to have the same dimensions across an entirety of the clear ink provided region. For example, when the clear ink provided region is defined in both of a portion where the colored image 42 (see FIG. 6) is to be printed and a portion where no colored image 42 is to be printed, the dimensions of the dots 32 of clear ink in the portion where the colored image 42 is to be printed may be set to be different from the dimensions of the dots 32 of clear ink in the portion where no colored image 42 is to be printed. In one example, the dots 32 of clear ink may be set to have first dimensions in the portion where no colored image 42 is to be printed and may be set to have second dimensions, which are relatively larger than the first dimensions, in the portion where the colored image 42 is to be printed. Alternatively, the dots 32 of clear ink may be set to have various dimensions in the portion where the colored image 42 is to be printed.

The formation density of dots is the proportion of pixels, for which dots are to be formed, to pixels located in a predetermined region (i.e., the number of unit pixels). The dots 32 (see FIG. 7) of clear ink may be set to have the same formation density across the entirety of the clear ink provided region. For example, when the clear ink provided region is defined in both of a portion where the colored image 42 is to be printed and a portion where no colored image 42 is to be printed, the formation density of the dots 32 of clear ink in the portion where the colored image 42 is to be printed may be set to be different from the formation density of the dots 32 of clear ink in the portion where no colored image 42 is to be printed. In one example, the dots 32 of clear ink may be set to have a first formation density in the portion where no colored image 42 is to be printed and may be set to have a second formation density, which is relatively higher than the first formation density, in the portion where the colored image 42 is to be printed.

The feed controller 22 controls the conveying operation. The feed controller 22 controls movement of the recording medium 2 in the sub-scanning direction X. The feed controller 22 controls driving of the feed motor 5C. The feed controller 22 controls the feed motor 5C so as to sequentially convey the recording medium 2, for example, from an upstream side (or rear side) to a downstream side (or front side) in the sub-scanning direction X. The feed controller 22 feeds the recording medium 2 forward by a predetermined conveyance width for each conveying operation. The conveyance width is a distance equal to or shorter than the length L1 of each nozzle row 13A of the ink head 12 in the sub-scanning direction X. The conveyance width is set in advance and may be stored in the storage 26. The conveyance width is, for example, one-half, one-fourth, one-eighth, or one-sixteenth the length L1 of each nozzle row 13A.

The scanning controller 23 controls the printing operation. The scanning controller 23 controls movement of the carriage 10 in the main scanning direction Y. The scanning controller 23 controls driving of the carriage motor 8. The scanning controller 23 controls the carriage motor 8 so as to cause the carriage 10 to move (or scan) in the first scanning direction and the second scanning direction. The first scanning direction extends from the first side to the second side in the main scanning direction Y (i.e., from left to right in FIG. 1). The second scanning direction extends from the second side to the first side in the main scanning direction Y (i.e., from right to left in FIG. 1). The scanning controller 23 causes the carriage 10 to move (or scan) in the main scanning direction Y once or more than once each time the recording medium 2 is fed forward by the predetermined conveyance width by the feed controller 22.

The storage 26 preliminarily stores a common driving signal including a plurality of pulse waveforms (or driving pulses) for discharge of a predetermined amount of ink. The common driving signal may be able to form, for example, three types of dots having different dimensions, such as a small dot, a medium dot, and a large dot. The common driving signal may be able to generate a small dot driving signal, a medium dot driving signal, and a large dot dedicated driving signal each including a single driving pulse or two or more driving pulses for a preset unit time (or driving period) that is a period of time during which a single dot is to be formed. At least some of the driving pulses may be a waveform including a waveform element to cause the voltage(s) across the actuator(s) 16 to drop to lower level(s) so as to expand the pressure chamber(s) 15, a waveform element to maintain the voltage(s) at the lower level(s) so as to keep the pressure chamber(s) 15 in the expanded state, and a waveform element to raise the voltage(s), which have/has been maintained at the lower level(s), so as to cause the pressure chamber(s) 15 to contract.

The discharge controller 24 controls the printing operation. In accordance with the print data, the discharge controller 24 causes the ink head 12 (i.e., at least one of the first sub-head 121 and the second sub-head 122) to discharge photo-curable ink so as to form an image on the recording medium 2. The discharge controller 24 supplies the driving pulse(s) to the actuator(s) 16. Specifically, the discharge controller 24 selects, from among the driving pulses included in the common driving signal, a single driving pulse or two or more driving pulses within a driving period in accordance with, for example, the dimensions of dots to be formed, and then supplies the selected driving pulse(s) to the actuator(s) 16. In accordance with the selected driving pulse(s), the discharge controller 24 changes the fluid volume of photo-curable ink to be discharged from the nozzles 13 and decides the dimensions of dots to be formed on the recording medium 2.

In the present preferred embodiment, the discharge controller 24 includes a first discharge controller 241, a second discharge controller 242, and a third discharge controller 243. The first discharge controller 241 causes the first sub-head 121 and the second sub-head 122 to discharge ink. The second discharge controller 242 causes only the first sub-head 121 to discharge ink. In other words, the second discharge controller 242 does not cause the second sub-head 122 to discharge ink. The third discharge controller 243 causes only the second sub-head 122 to discharge ink. In other words, the third discharge controller 243 does not cause the first sub-head 121 to discharge ink.

The first discharge controller 241 causes the ink head 12 to discharge two types of ink simultaneously along at least a portion of a movement path for the carriage 10 in the main scanning direction Y during a single printing operation (i.e., when the carriage 10 makes a single movement in the first scanning direction or the second scanning direction). Specifically, the first discharge controller 241 causes the first sub-head 121 to discharge, from its nozzles 13, the colored ink CO and causes the second sub-head 122 to discharge, from its nozzles 13, clear ink. In other words, the first discharge controller 241 supplies the driving pulse(s) to the actuators 16 of the first sub-head 121 and the second sub-head 122. In the present preferred embodiment, the first discharge controller 241 supplies the driving pulse(s) to at least the actuators 16 of the first sub-head 121 and the second sub-head 122 that are adjacent to each other in the main scanning direction Y. Accordingly, the colored ink CO and clear ink are discharged onto a target region on the recording medium 2 during a single printing operation.

In the present preferred embodiment, the first discharge controller 241 is configured or programmed to form the colored image 42 (see FIG. 6) including the colored ink CO, and the texture image 44 (see FIG. 6) in which the colored ink CO and clear ink are mixed. A region where the texture image 44 is formed (e.g., the clear ink provided region) is relatively greater in irregularity (or surface roughness) than a region where no texture image 44 is formed (e.g., a region where the colored image 42 including the colored ink CO is formed). Accordingly, the present preferred embodiment is able to provide a texture to a surface of the printed matter 40 (see FIG. 6). Actually, a surface of the colored image 42 is also not completely flat. The roughness of the surface of the colored image 42 (which is, for example, a maximum height Rz determined in accordance with JIS B0601: 2013) is about 0.01 mm or lower. An arithmetic average roughness Ra of the region where the texture image 44 is formed is typically greater than the maximum height Rz of the colored image 42 including the colored ink CO. The arithmetic average roughness Ra is a value determined in accordance with JIS B0601: 2013. The same goes for the following description. The arithmetic average roughness Ra is preferably twice or more than twice the maximum height Rz, three times or more than three times the maximum height Rz, or five times or more than five times the maximum height Rz. In one example, the arithmetic average roughness Ra may be 20 times or less than 20 times the maximum height Rz, or may be 10 times or less than 10 times the maximum height Rz.

The texture image 44 (see FIG. 6) is typically formed directly on a surface of the recording medium 2. Alternatively, the texture image 44 may be formed on, for example, a surface of the colored image 42 (see FIG. 6). In some preferred embodiments, the texture image 44 may be a regular pattern formed by repeating a design. The texture image 44 may be a regular pattern including, for example, a single or more than one pattern shape 30 (see FIG. 7). When the texture image 44 is a regular pattern including more than one pattern shape 30, the pattern shapes 30 may be disposed at predetermined pitches P in a scattered manner. Each pitch P is a distance between the ends of the pattern shapes 30 adjacent to each other (see FIG. 7). In some preferred embodiments, the texture image 44 may not be a regular pattern but may be a random pattern that is not oriented in any particular direction. In some preferred embodiments, the texture image 44 may be a geometric pattern including predetermined figures. Providing the texture image 44 in the form of a geometric pattern effectively changes the appearance of the printed matter 40 (see FIG. 6).

In the present preferred embodiment, adjusting, for example, the form, size, and/or location of each pattern shape 30 (see FIG. 7) varies the texture of the surface of the printed matter 40 (see FIG. 6), e.g., the appearance of the printed matter 40 or a tactile sensation that the printed matter 40 provides. In other words, the form, size, and/or location of each pattern shape 30, for example, are/is preferably adjusted as appropriate so as to provide a desired texture to the printed matter 40. Although each pattern shape 30 is not limited to any particular form, the external form of each pattern shape 30 may be, for example, an inverted V-form, a conical form, or a polygonal pyramid form. In a plan view, each pattern shape 30 may be, for example, a linear shape, a circular shape (such as an elliptical shape), or a polygonal shape (such as a triangular shape, a quadrangular shape, or a pentagonal shape). When viewed in cross section, each pattern shape 30 may be, for example, a dome shape or a triangular shape whose center is protruded upward, or a bowl shape whose center is recessed.

Each pattern shape 30 may have a diameter ϕ of between, for example, about 0.05 mm and about 0.5 mm. When each pattern shape 30 is a polygonal shape, the diameter ϕ is the diameter of a circle equivalent to the area of each polygonal shape (see FIGS. 6 and 7). Each pattern shape 30 may have a height H of between about 0.02 mm and about 0.1 mm. The height H is the maximum height of each pattern shape 30 (see FIG. 7). An average of the heights H of the pattern shapes 30 (hereinafter referred to as an "average height") is typically greater than the maximum height Rz of the colored image 42. The average height is preferably twice or more than twice the maximum height Rz, three times or more than three times the maximum height Rz, or five times or more than five times the maximum height Rz. In one example, the average height may be 20 times or less than 20 times the maximum height Rz, or may be 10 times or less than 10 times the maximum height Rz. The pitches P between the pattern shapes 30 (see FIGS. 6 and 7) may each be, for example, between about 0.1 mm and about 1.0 mm. Satisfying at least one of the conditions just described gives a remarkable texture to the printed matter 40 (or enables the printed matter 40 to provide, for example, a remarkable tactile sensation) while maintaining its beautiful appearance.

The fluid volume of ink to be discharged per unit area of the recording medium 2 is controllable by, for example, the number of head portions to be used, the dimensions and formation densities of the dots 31 and 32 included in the print setting information, and/or driving pulses for the ink head 12. In one example, the first discharge controller 241 may control the second sub-head 122 such that the two head portions 12CL each discharge clear ink. The first discharge controller 241 may control the first sub-head 121 and the second sub-head 122 such that the fluid volume of clear ink to be discharged from each of the nozzles 13 of the second sub-head 122 is larger than the fluid volume of the colored ink CO to be discharged from each of the nozzles 13 of the first sub-head 121. When the common driving signal includes a first driving pulse to discharge ink by a first discharge amount and a second driving pulse to discharge ink by a second discharge amount larger than the first discharge amount, the first discharge controller 241 may supply the first driving pulse to the first sub-head 121 and supply the second driving pulse to the second sub-head 122.

In the present preferred embodiment, the first discharge controller 241 is configured or programmed to cause the first sub-head 121 and the second sub-head 122 to discharge ink from their nozzles 13 located in corresponding regions in the sub-scanning direction X. In other words, the first discharge controller 241 is configured or programmed to cause the first sub-head 121 and the second sub-head 122 to discharge ink from portions of their nozzle rows 13A corresponding to each other along at least a predetermined length.

For example, assuming that the nozzle rows 13A are each divided into a plurality of nozzle regions in the sub-scanning direction X and ink is to be discharged from the nozzles 13 included in at least one nozzle region of each nozzle row 13A, the first discharge controller 241 may be configured or programmed to cause the first sub-head 121 and the second sub-head 122 to discharge ink from the nozzles 13 included in the nozzle regions adjacent to each other in the main scanning direction Y. In this case, the nozzle regions of the first sub-head 121 preferably at least partially correspond in position to the nozzle regions of the second sub-head 122 in the sub-scanning direction X. The nozzle regions of the first sub-head 121 may be different in length from the nozzle regions of the second sub-head 122 in the sub-scanning direction X. The first discharge controller 241 may be configured or programmed to cause the first sub-head 121 and the second sub-head 122 to discharge ink from an entirety of each nozzle row 13A across the length L1.

The second discharge controller 242 causes the first sub-head 121 to discharge, from its nozzles 13, the colored ink CO so as to form only the colored image 42 (see FIG. 6) during a single printing operation (i.e., when the carriage 10 makes a single movement in the first scanning direction or the second scanning direction). The third discharge controller 243 causes the second sub-head 122 to discharge, from its nozzles 13, clear ink so as to form only the texture image 44 (see FIG. 6) during a single printing operation (i.e., when the carriage 10 makes a single movement in the first scanning direction or the second scanning direction). The second discharge controller 242 and/or the third discharge controller 243 are/is not essential and may be optional in other preferred embodiments.

The application controller 25 controls the printing operation. The application controller 25 causes the UV lamps 17 to apply light to photo-curable ink (e.g., the colored ink CO and clear ink), which has been discharged onto the recording medium 2 under control of the discharge controller 24, so as to cure the photo-curable ink. The application controller 25 controls the UV lamps 17 such that the UV lamps 17 are turned ON and OFF. For example, suppose that the carriage 10 moves in the main scanning direction Y while photo-curable ink is being discharged from the ink head 12 or no photo-curable ink is being discharged from the ink head 12 under control of the discharge controller 24. In this case, the application controller 25 turns ON the UV lamps 17 so as to apply ultraviolet light to the photo-curable ink discharged onto the recording medium 2.

As previously mentioned, the printer 1 alternately repeats the conveying operation and the printing operation so as to effect printing on the recording medium 2. Suppose that the colored image 42 (see FIG. 6) and the texture image 44 (see FIG. 6) are to be formed on the recording medium 2 under control of the first discharge controller 241. In this case, ink is discharged from at least the nozzles 13 of the first sub-head 121 and the second sub-head 122 located at corresponding positions in the sub-scanning direction X during a single printing operation (i.e., during a single movement of the carriage 10 in the first scanning direction or the second scanning direction along at least a portion of the movement path for the carriage 10 in the main scanning direction Y). Specifically, the colored ink CO is discharged from the nozzles 13 of the first sub-head 121, and clear ink is discharged from the nozzles 13 of the second sub-head 122. The colored ink CO and clear ink discharged from the nozzles 13 both hit a predetermined region on the recording medium 2. As used herein, the term "predetermined region" refers to a common region onto which ink is dischargeable from both of the nozzles 13 of the first sub-head 121 and the nozzles 13 of the second sub-head 122 during a single movement of the carriage 10 in the first scanning direction or the second scanning direction. The application controller 25 turns ON the UV lamps 17 so as to apply ultraviolet light to the colored ink CO and clear ink that have hit the recording medium 2 and are yet to be cured. The ultraviolet light applied from the UV lamps 17 cures the colored ink CO and clear ink.

For example, suppose that the printer 1 including the ink head 12 illustrated in FIG. 2 is used to discharge the colored ink CO and clear ink in this order onto a predetermined region during a single printing operation (or a single pass). In this case, the dots 31 (see FIG. 7) of the colored ink CO are formed on the recording medium 2, and the dots 32 (see FIG. 7) of transparent ink are formed on the dots 31 of the colored ink CO. In contrast, suppose that clear ink and the colored ink CO are discharged in this order onto a predetermined region during a single printing operation (or a single pass). In this case, the dots 32 of transparent ink are formed on the recording medium 2, and the dots 31 of the colored ink CO are formed on the dots 32 of transparent ink. The dots 31 and 32 are thus formed in layers on the predetermined region in the up-down direction Z (or the direction of thickness of the recording medium 2) such that the texture image 44 (see FIG. 6) is formable. Consequently, the colored image 42 (see FIG. 6) and the texture image 44 (see FIG. 6) are formed on the recording medium 2.

Figure 5A:
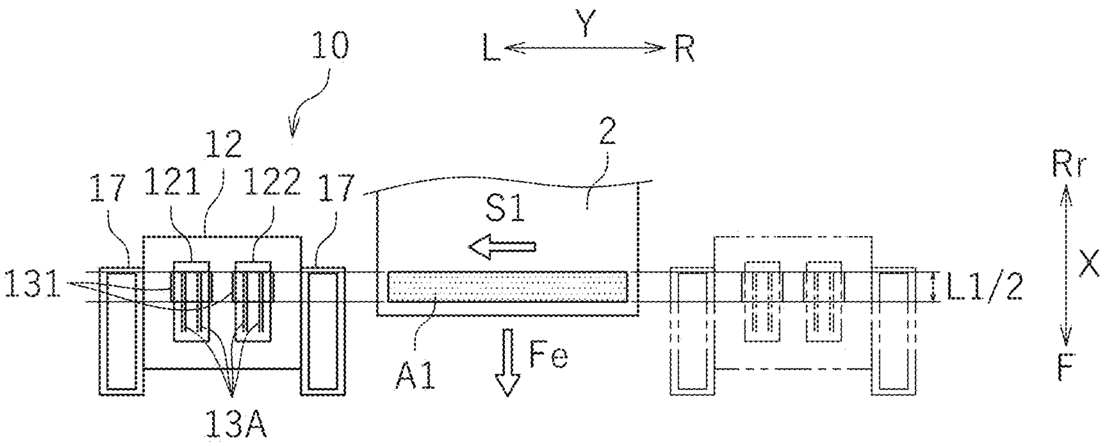
FIGS. 5A to 5C are plan views of the printer, illustrating how the printer operates in effecting multi-pass printing.
Figure 5B:
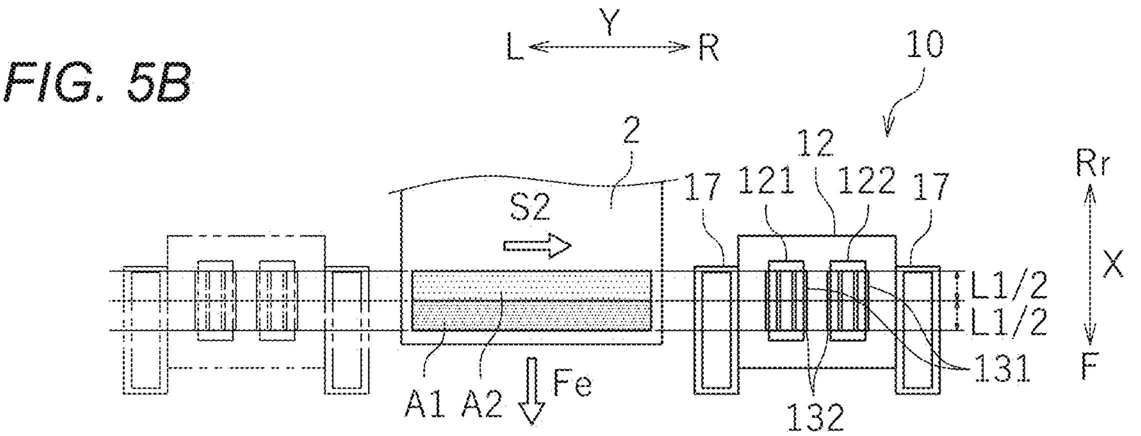
Figure 5C:
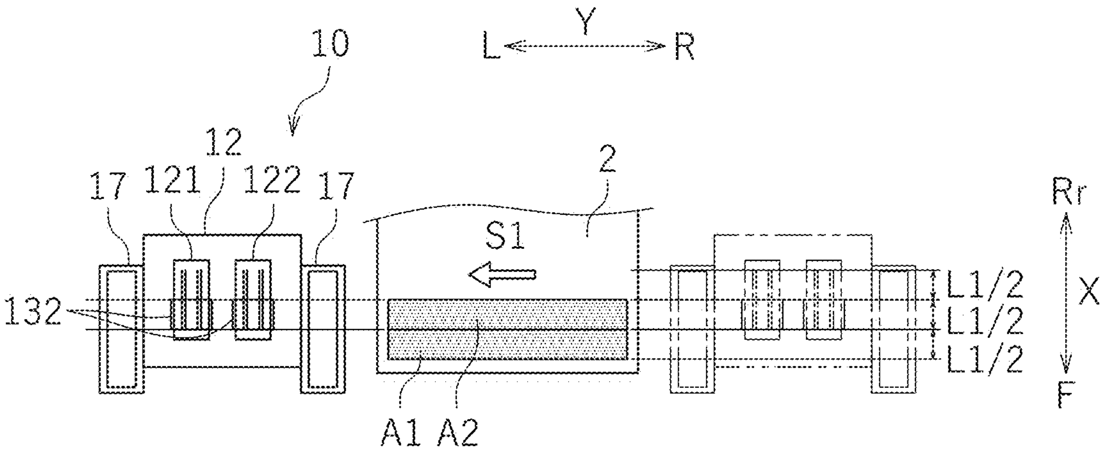

In the present preferred embodiment, the printer 1 effects "multi-pass printing" that involves effecting printing by moving the carriage 10 over a targeted one of the print regions on the recording medium 2 more than once. Referring now to FIGS. 5A to 5C, the following description discusses how the printer 1 operates on the assumption that the printer 1 effects two-pass printing. In FIGS. 5A to 5C, some of the nozzle rows 13A are not illustrated for the sake of simplification of description. As illustrated in FIGS. 5A to 5C, each nozzle row 13A is divided into two nozzle sub-rows in the sub-scanning direction X, one of which is an upstream (or rear) nozzle sub-row 131 and the other one of which is a downstream (or front) nozzle sub-row 132. In the present preferred embodiment, the carriage 10 is moved twice over the target print region on the recording medium 2, assuming that a value (L1/2), which is obtained by dividing the length L1 of each nozzle row 13A by two (corresponding to the number of passes), is determined to be a single conveyance width for the recording medium 2.

FIG. 5A illustrates a first round of the printing operation. As illustrated in FIG. 5A, the first round of the printing operation involves moving the carriage 10 in the second scanning direction (i.e., in the direction of an arrow S1 indicating movement from right to left in FIG. 5A), and discharging ink from the nozzle sub-rows 131 of the first sub-head 121 and the nozzle sub-rows 131 of the second sub-head 122. Specifically, the first round of the printing operation involves discharging the colored ink CO onto a pass print region A1 on the recording medium 2 from the nozzle sub-rows 131 of the first sub-head 121, and discharging clear ink onto the pass print region A1 from the nozzle sub-rows 131 of the second sub-head 122. The first round of the printing operation further involves applying ultraviolet light from the UV lamps 17. After the first round of the printing operation, the printer 1 performs a first round of the conveying operation involving conveying the recording medium 2 to the downstream side in the sub-scanning direction X by the conveyance width L1/2 as indicated by an arrow Fe. This conveying operation causes the pass print region A1 to move to the downstream side relative to the nozzle sub-rows 131. After the first round of the conveying operation, the printer 1 performs a second round of the printing operation.

FIG. 5B illustrates the second round of the printing operation. As illustrated in FIG. 5B, the second round of the printing operation involves moving the carriage 10 in the first scanning direction (i.e., in the direction of an arrow S2 indicating movement from left to right in FIG. 5B), and discharging ink from the nozzle sub-rows 131 and 132 of the first sub-head 121 and the nozzle sub-rows 131 and 132 of the second sub-head 122. Specifically, the second round of the printing operation involves discharging the colored ink CO onto the pass print region A1 on the recording medium 2 from the nozzle sub-rows 132 of the first sub-head 121, and discharging clear ink onto the pass print region A1 from the nozzle sub-rows 132 of the second sub-head 122. The second round of the printing operation further involves applying ultraviolet light from the UV lamps 17. Ink dots are thus formed in layers in the up-down direction Z on the pass print region A1 such that the colored image 42 and the texture image 44 are formed thereon. The second round of the printing operation then involves discharging the colored ink CO onto a pass print region A2 on the recording medium 2 from the nozzle sub-rows 131 of the first sub-head 121, and discharging clear ink onto the pass print region A2 from the nozzle sub-rows 131 of the second sub-head 122. The second round of the printing operation further involves applying ultraviolet light from the UV lamps 17. After the second round of the printing operation, the printer 1 performs a second round of the conveying operation, which is similar to the first round of the conveying operation, as indicated by the arrow Fe. This conveying operation causes the pass print region A2 to move to the downstream side relative to the nozzle sub-rows 131. After the second round of the conveying operation, the printer 1 performs a third round of the printing operation.

FIG. 5C illustrates the third round of the printing operation. As illustrated in FIG. 5C, the third round of the printing operation involves moving the carriage 10 in the second scanning direction (i.e., in the direction of the arrow S1 indicating movement from right to left in FIG. 5C), and discharging ink from the nozzle sub-rows 132 of the first sub-head 121 and the nozzle sub-rows 132 of the second sub-head 122. Specifically, the third round of the printing operation involves discharging the colored ink CO onto the pass print region A2 on the recording medium 2 from the nozzle sub-rows 132 of the first sub-head 121, and discharging clear ink onto the pass print region A2 from the nozzle sub-rows 132 of the second sub-head 122. The third round of the printing operation further involves applying ultraviolet light from the UV lamps 17. Ink dots are thus formed in layers in the up-down direction Z on the pass print region A2 such that the colored image 42 and the texture image 44 are formed thereon.

Figure 6:
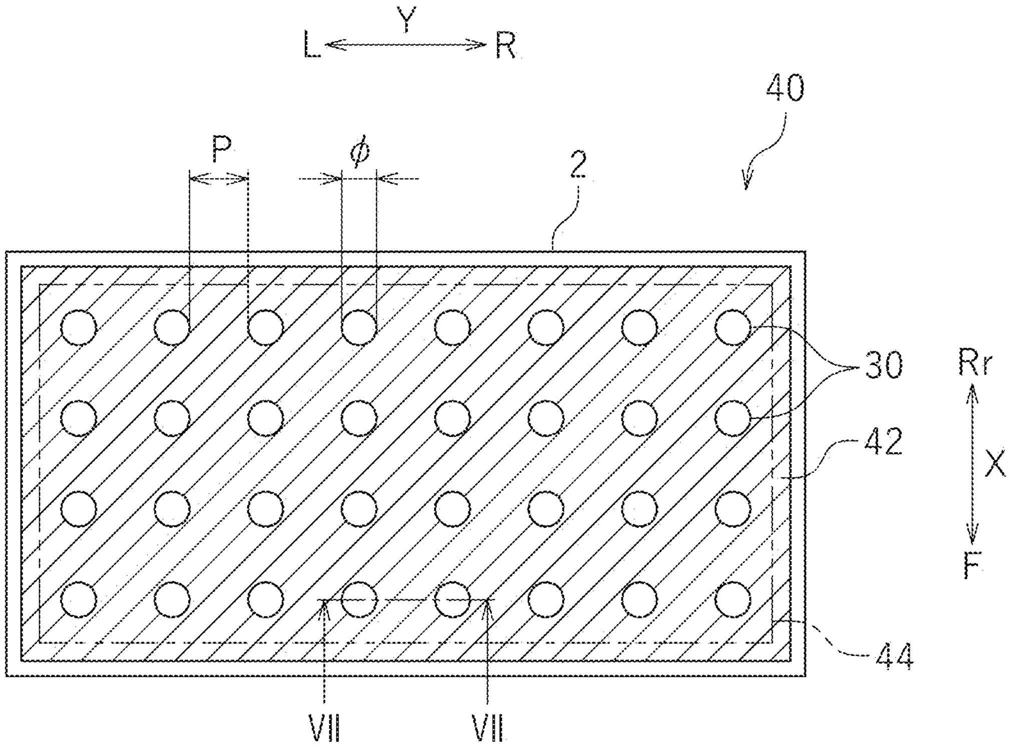
FIG. 6 is a schematic plan view of an exemplary printed matter.
Figure 7:
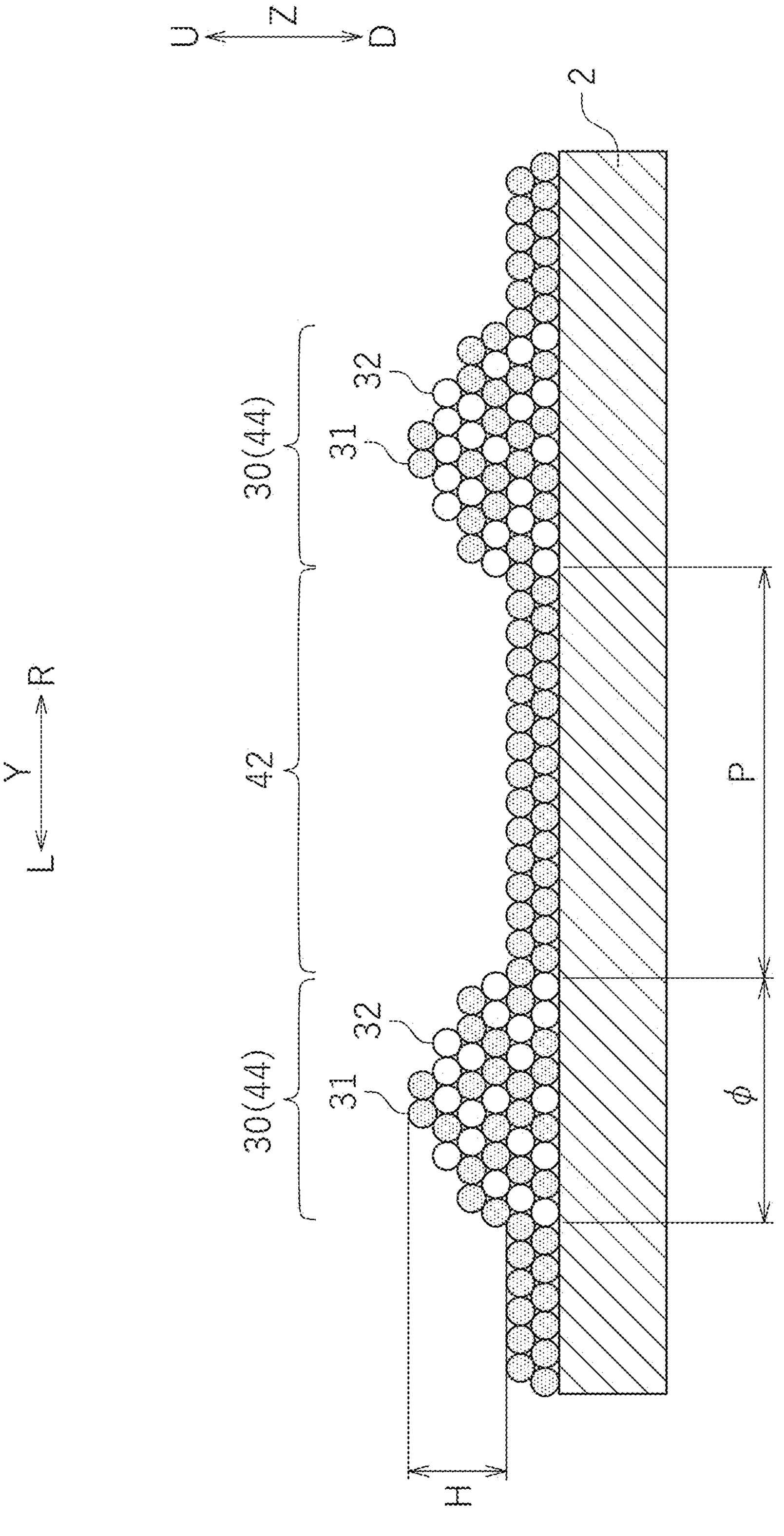
FIG. 7 is an enlarged cross-sectional view of a portion of the printed matter illustrated in FIG. 6.

FIG. 6 is a schematic plan view of the printed matter 40 provided by the printer 1. FIG. 7 is an enlarged cross-sectional view of a portion of the printed matter 40 illustrated in FIG. 6. The printed matter 40 illustrated in FIG. 6 includes the recording medium 2, the colored image 42, and the texture image 44. In the plan view, the colored image 42 and the texture image 44 are each exposed at a surface of the printed matter 40. The texture image 44 is formed such that the texture image 44 overlaps with the colored image 42.

As illustrated in FIG. 6, the texture image 44 is a pattern in which the pattern shapes 30 identical in shape are disposed regularly at the predetermined pitches P. In this preferred embodiment, the outer periphery of each pattern shape 30 is surrounded by the colored image 42. The outer edge of each pattern shape 30 is in contact with the colored image 42. The pattern shapes 30 each have a circular shape in the plan view. As illustrated in FIG. 7, the pattern shapes 30 each have a dome shape when viewed in cross section. In this preferred embodiment, the diameter ϕ of each pattern shape 30 may be about 0.1 mm, the height H of each pattern shape 30 may be about 0.05 mm, and each pitch P between the pattern shapes 30 adjacent to each other may be about 0.1 mm.

As illustrated in FIG. 7, each pattern shape 30 is an assemblage of ink dots. Specifically, each pattern shape 30 is an assemblage of one or more dots 31 of the colored ink CO and one or more dots 32 of clear ink. In this preferred embodiment, each pattern shape 30 includes more than one dot 31 of the colored ink CO and more than one dot 32 of clear ink. Lowermost ones of the dots 31 and 32 within each pattern shape 30 are in contact with the surface of the recording medium 2 (i.e., a surface of the recording medium 2 that faces the ink head 12). In the present preferred embodiment, the dots 31 and 32 are scattered in the main scanning direction Y and the up-down direction Z within each pattern shape 30. The dots 31 and 32 are intermingled in the main scanning direction Y and the up-down direction Z within each pattern shape 30. The dots 31 within each pattern shape 30 are arranged, for example, in the form of larger dots (or in the form of islands) located away from each other in the main scanning direction Y and/or the up-down direction Z, and the dots 32 within each pattern shape 30 are also arranged, for example, in the form of larger dots (or in the form of islands) located away from each other in the main scanning direction Y and/or the up-down direction Z. In one example, assuming that the dots 31 arranged in the form of islands (hereinafter referred to as "first dot islands") and the dots 32 arranged in the form of islands (hereinafter referred to as "second dot islands") are distributed within each pattern shape 30, the second dot islands are located between the first dot islands. The dots 31 and 32 are distributed substantially uniformly within each pattern shape 30.

As described above, the printer 1 is able to discharge the colored ink CO and clear ink during a single round of scanning so as to form the texture image 44 including the pattern shapes 30 on the recording medium 2. Accordingly, the technique according to the present preferred embodiment is able to yield a higher throughput than, for example, the technique disclosed in JP 2011-161824 A. As illustrated in FIGS. 2(a) to 2(c) of JP 2011-161824 A, the technique disclosed in JP 2011-161824 A requires performing a total of three steps in order to form images on predetermined regions B1 and B2. The first step involves forming a colored image on the region B1 by using colored ink (see FIG. 2(a)). The second step involves forming an image on each of the two regions B1 and B2 (see FIG. 2(b)). Specifically, the second step involves forming a colored image on the region B2 by using colored ink, and forming an image on the region B1 by using clear ink. The final step involves forming an image on the region B2 by using clear ink (see FIG. 2(c)). The technique according to the present preferred embodiment, however, is able to discharge the colored ink CO and clear ink simultaneously onto a target region. Thus, when the technique according to the present preferred embodiment is used to form images on the regions B1 and B2 illustrated in FIGS. 2(a) to 2(c) of JP 2011-161824 A, it is only necessary to perform a total of two steps (one for the region B1 and the other for the region B2). Consequently, the technique according to the present preferred embodiment is able to yield a higher throughput and make printing time shorter than the technique disclosed in JP 2011-161824 A.

In the plan view (i.e., when the surface of the recording medium 2 is viewed), the dots 31 of the colored ink CO and the dots 32 of clear ink are scattered in each pattern shape 30. The present preferred embodiment is thus able to reduce differences in gloss of the surface of the texture image 44. The present preferred embodiment is able to reduce, for example, differences in gloss between a portion where the pattern shapes 30 of the texture image 44 are formed and a portion where the colored image 42 is exposed (e.g., a portion located on the right or left of each pattern shape 30 in FIG. 7). Accordingly, the present preferred embodiment is able to increase the unity of the colored image 42 and the texture image 44, which makes the user feel less strange about the appearance of the printed matter 40 and may enhance the beauty of the printed matter 40.

Because photo-curable ink is cured relatively quickly on the recording medium 2, the dots 31 and 32 are unlikely to mix with each other excessively to cause blurring of the colored ink CO and/or distortion of the colored image 42. The amount of dots 31 of the colored ink CO to be provided per unit area of the recording medium 2 is decided in accordance with the colored ink print data irrelevant to the transparent ink print data. This uniformizes the absolute quantity of colorant per unit area of the recording medium 2 in a portion where the pattern shapes 30 of the texture image 44 are formed and a portion where the colored image 42 is exposed (e.g., a portion located on the right or left of each pattern shape 30 in FIG. 7). Accordingly, the present preferred embodiment is able to reduce differences in color between the colored image 42 and the texture image 44 in the plan view (e.g., when the surface of the recording medium 2 is viewed).

The dots 32 of clear ink mixed into the pattern shapes 30 when viewed in cross section make the pattern shapes 30 more three-dimensional. Accordingly, the present preferred embodiment enables the printed matter 40 to provide a desired tactile sensation by selectively forming irregularities on desired portion(s) of the colored image 42 while reducing, for example, changes in the appearance of the colored image 42 (e.g., differences in color and/or reflectance of the surface of the colored image 42). The texture image 44 is preferably combined with the colored image 42 to such an extent that the texture image 44 is undistinguishable from the colored image 42 by a glance at the printed matter 40 and only recognizable when the printed matter 40 is touched.

In the present preferred embodiment, the controller 20 is configured or programmed to move the carriage 10 in the main scanning direction Y (i.e., the first direction) over a target region on the recording medium 2 more than once so as to form the texture image 44 in which the dots 31 of the colored ink CO and the dots 32 of transparent ink are mixed in the up-down direction Z (i.e., the direction of thickness of the texture image 44). If the colored ink head portions 12C, 12M, 12Y, 12K, and 12W and the clear ink head portions 12CL are disposed side by side in the main scanning direction Y as illustrated in FIG. 2, for example, moving the carriage 10 in the main scanning direction Y more than once (e.g., reciprocating the carriage 10 or moving the carriage 10 twice in the same direction) would enable two types of ink to be mixed in the direction of thickness of the texture image 44. The present preferred embodiment is thus able to make the texture image 44 more three-dimensional while effectively reducing changes in the appearance of the printed matter 40. For example, when the clear ink head portion(s) is/are disposed between the colored ink head portions or when the colored ink head portion(s) is/are disposed between the clear ink head portions, moving the carriage 10 in the main scanning direction Y just once enables two types of ink to be mixed in the direction of thickness of the texture image 44.

In the present preferred embodiment, if the carriage 10 is moved over a target region on the recording medium 2 more than once, forming ink layers that satisfy similar conditions (e.g., forming similar images and/or similar irregularities) would achieve a higher throughput than layer printing. Specifically, layer printing requires performing two steps, i.e., the step of moving a carriage so as to form a colored image by using colored ink and the subsequent step of further moving the carriage so as to form an uneven image by using clear ink. In forming such two types of images, the present preferred embodiment requires just one step that involves moving the carriage 10 while simultaneously discharging colored ink and clear ink onto a target region. Consequently, the present preferred embodiment is able to yield a higher throughput than layer printing.

In the present preferred embodiment, the first discharge controller 241 is configured or programmed to control the ink head 12 such that photo-curable ink is discharged from the nozzles 13 included in regions of the first sub-head 121 (i.e., the nozzle rows 13A of the head portions 120, 12M, 12Y, 12K, and 12W) and the second sub-head 122 (i.e., the nozzle rows 13A of the head portions 12CL) that are located at corresponding positions in the sub-scanning direction X. In one example, the regions of the first sub-head 121 and the second sub-head 122 located at corresponding positions in the sub-scanning direction X are each located along at least a portion of the length L1. Specifically, the regions of the first sub-head 121 and the second sub-head 122 located at corresponding positions in the sub-scanning direction X may each be located along an entirety of the length L1 or a portion of the length L1. Accordingly, the present preferred embodiment is able to form the pattern shapes 30 stably and speedily, resulting in a further increase in printing throughput.

In the present preferred embodiment, the first discharge controller 241 is configured or programmed to control the ink head 12 such that the amount of photo-curable ink to be discharged from each of the nozzles 13 of the second sub-head 122 (i.e., each of the nozzles 13 in the nozzle rows 13A of the head portions 12CL) is larger than the amount of photo-curable ink to be discharged from each of the nozzles 13 of the first sub-head 121 (i.e., each of the nozzles 13 in the nozzle rows 13A of the head portions 12C, 12M, 12Y, 12K, and 12W). The present preferred embodiment is thus able to increase the proportion of the dots 32 of clear ink in each pattern shape 30 so as to make the texture image 44 more three-dimensional. Consequently, the present preferred embodiment is able to effectively enhance a tactile sensation when the printed matter 40 is touched.

In the present preferred embodiment, the head portions 12C, 12M, 12Y, and 12K each include the nozzle row 13A (i.e., the first colored ink nozzle group) in which the nozzles 13 to discharge photo-curable ink of any one of process colors (i.e., the first color) are in alignment with each other in the sub-scanning direction X. The number of nozzle rows 13A in the head portions 12CL is larger than the number of nozzle rows 13A (i.e., the number of first colored ink nozzle groups) included in each of the head portions 12C, 12M, 12Y, and 12K. The present preferred embodiment is thus able to increase the proportion of the dots 32 of clear ink in each pattern shape 30 so as to make the texture image 44 more three-dimensional. Consequently, the present preferred embodiment is able to effectively enhance a tactile sensation when the printed matter 40 is touched.

In the present preferred embodiment, the head portions of the ink head 12 each include the hollow case body 14 in which the nozzles 13 are defined, the pressure chamber 15 which is defined in the case body 14, which is in communication with the nozzles 13, and in which photo-curable ink is stored, the diaphragm 14V disposed inside the case body 14 and defining a portion of the pressure chamber 15, and the actuator 16 (which is a piezoelectric element) connected to the diaphragm 14V and configured to, upon receiving a driving pulse, cause the pressure chamber 15 to expand or contract. The first discharge controller 241 includes the storage 26 storing the first driving pulse to cause each of the nozzles 13 to discharge photo-curable ink by the first discharge amount, and the second driving pulse to cause each of the nozzles 13 to discharge photo-curable ink by the second discharge amount larger than the first discharge amount. The first discharge controller 241 is configured or programmed to supply the first driving pulse to the first sub-head 121 (i.e., the nozzle rows 13A of the head portions 12C, 12M, 12Y, 12K, and 12W) and supply the second driving pulse to the second sub-head 122 (i.e., the nozzle rows 13A of the head portions 12CL). The present preferred embodiment is thus able to increase the proportion of the dots 32 of clear ink in each pattern shape 30 so as to make the texture image 44 more three-dimensional. Consequently, the present preferred embodiment is able to effectively enhance a tactile sensation when the printed matter 40 is touched.

The preferred embodiments of the present invention have been described thus far. The preferred embodiments described above, however, are merely illustrative. The present invention may be embodied in various other forms.

Figure 8A:
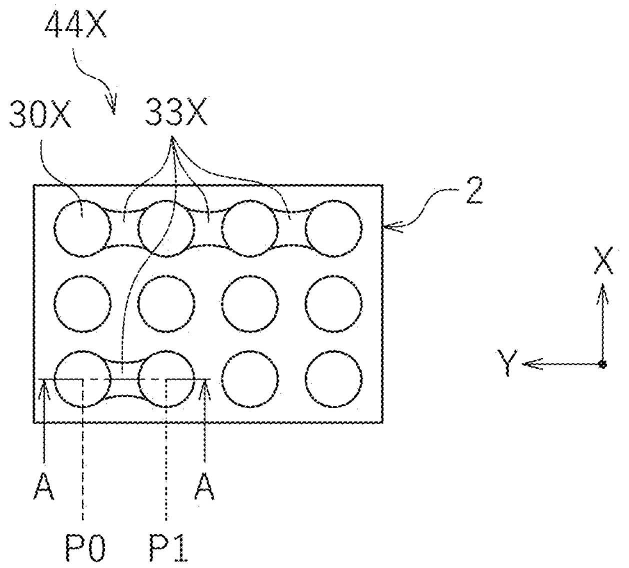
FIG. 8A is a schematic plan view of a variation of a texture image.
Figure 8B:
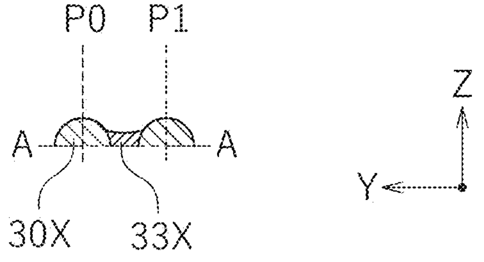
FIG. 8B is a schematic cross-sectional view of a portion of the texture image illustrated in FIG. 8A.

In the foregoing preferred embodiments, the texture image 44 is a regular pattern including the pattern shapes 30 disposed at the predetermined pitches P in a scattered manner. Alternatively, the texture image 44 may be any other suitable pattern. FIG. 8A is a plan view of a variation of the texture image 44 (which will hereinafter be referred to as a "texture image 44X"). FIG. 8B is a cross-sectional view of a portion of the texture image 44X illustrated in FIG. 8A. The texture image 44X illustrated in FIG. 8A includes pattern shapes 30X, six of which are not continuous with each other, four of which are continuous with each other in such a manner as to form a mountain range shape, and the remaining two of which are also continuous with each other in such a manner as to form a mountain range shape. Alternatively, any other number of pattern shapes 30X may be continuous with each other in such a manner as to form a mountain range shape, or all of the pattern shapes 30X may be continuous with each other in such a manner as to form a mountain range shape. The texture image 44X includes the pattern shapes 30X and connectors 33X connecting the pattern shapes 30X adjacent to each other. In this example, the surfaces of the connectors 33X have less irregularity than the surfaces of the pattern shapes 30X.

Figure 9A:
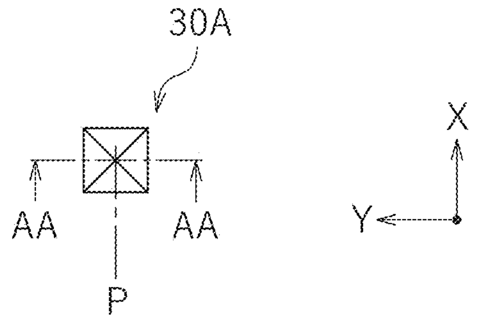
FIG. 9A is a schematic plan view of a variation of a pattern shape.
Figure 9B:
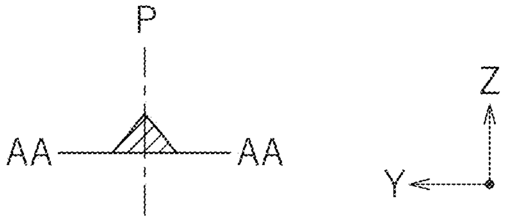
FIG. 9B is a schematic cross-sectional view of the pattern shape illustrated in FIG. 9A.
Figure 10A:
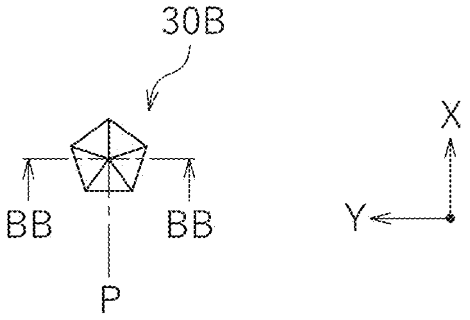
FIG. 10A is a schematic plan view of another variation of a pattern shape.

In the foregoing preferred embodiments, the pattern shapes 30 included in the texture image 44 each have a circular shape in a plan view and each have a dome shape when viewed in cross section. Alternatively, the pattern shapes 30 may each have any other suitable shape. FIG. 9A is a plan view of a variation of the pattern shape 30 (which will hereinafter be referred to as a "pattern shape 30A"). FIG. 9B is a cross-sectional view of the pattern shape 30A illustrated in FIG. 9A. The pattern shape 30A illustrated in FIGS. 9A and 9B has a quadrangular pyramid shape. The pattern shape 30A has a quadrangular shape in the plan view and has a triangular shape whose center is protruding upward when viewed in cross section. FIG. 10A is a plan view of another variation of the pattern shape 30 (which will hereinafter be referred to as a "pattern shape 30B"). FIG.

Figure 10B:
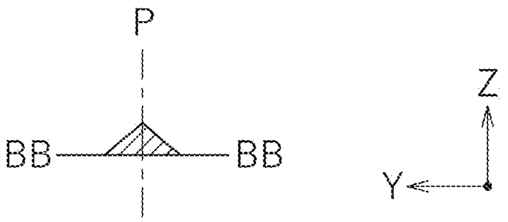
FIG. 10B is a schematic cross-sectional view of the pattern shape illustrated in FIG. 10A.
Figure 11A:
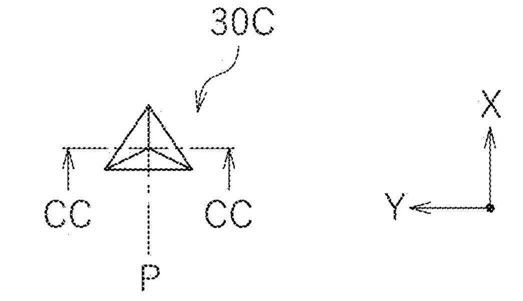
FIG. 11A is a schematic plan view of still another variation of a pattern shape.
Figure 11B:
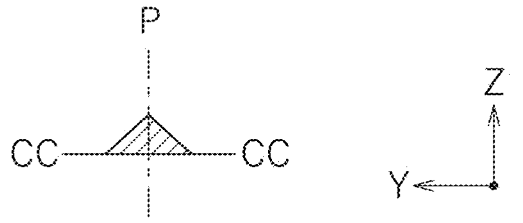
FIG. 11B is a schematic cross-sectional view of the pattern shape illustrated in FIG. 11A.
Figure 12A:
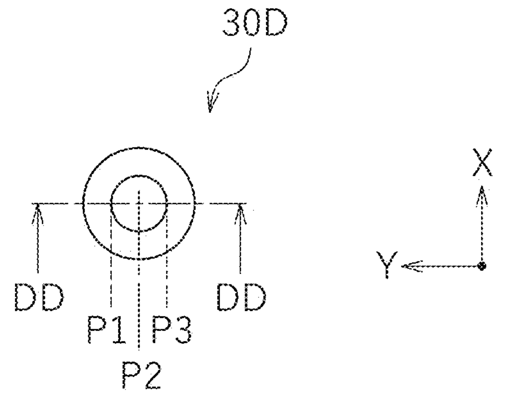
FIG. 12A is a schematic plan view of yet another variation of a pattern shape.
Figure 12B:
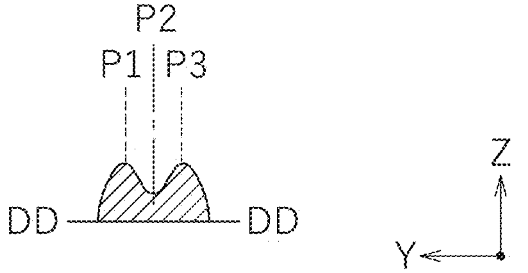
FIG. 12B is a schematic cross-sectional view of the pattern shape illustrated in FIG. 12A.

10B is a cross-sectional view of the pattern shape 30B illustrated in FIG. 10A. The pattern shape 30B illustrated in FIGS. 10A and 10B has a pentagonal pyramid shape. The pattern shape 30B has a pentagonal shape in the plan view and has a triangular shape whose center is protruding upward when viewed in cross section. FIG. 11A is a plan view of still another variation of the pattern shape 30 (which will hereinafter be referred to as a "pattern shape 30C"). FIG. 11B is a cross-sectional view of the pattern shape 30C illustrated in FIG. 11A. The pattern shape 30C illustrated in FIGS. 11A and 11B has a triangular pyramid shape. The pattern shape 30C has a triangular shape in the plan view and has a triangular shape whose center is protruding upward when viewed in cross section. FIG. 12A is a plan view of yet another variation of the pattern shape 30 (which will hereinafter be referred to as a "pattern shape 30D"). FIG. 12B is a cross-sectional view of the pattern shape 30D illustrated in FIG. 12A. The pattern shape 30D has a circular shape in the plan view and has a bowl shape whose center is recessed when viewed in cross section.

In the foregoing preferred embodiments, the dots 31 and 32 included in each pattern shape 30 are illustrated as having identical dimensions. The dots 31 and 32 included in each pattern shape 30, however, do not necessarily have to have identical dimensions. Alternatively, each pattern shape 30 may include dots having different dimensions. In one example, each pattern shape 30 may include at least two of a small dot, a medium dot, and a large dot. Suppose that when viewed in cross section, each pattern shape 30 is divided into two portions (e.g., an upper portion located adjacent to the surface of the pattern shape 30 and a lower portion located adjacent to the recording medium 2) in the direction of thickness of the pattern shape 30. In this case, the average dimensions of dots included in the upper portion may be different from the average dimensions of dots included in the lower portion. In each pattern shape 30 having a dome shape when viewed in cross section as illustrated in FIG. 7, for example, the number of small dots included in the upper portion of each pattern shape 30 may be larger than the number of small dots included in the lower portion of each pattern shape 30, and/or the number of large dots included in the lower portion of each pattern shape 30 may be larger than the number of large dots included in the upper portion of each pattern shape 30. In the texture image 44X having a mountain range shape when viewed in cross section as illustrated in FIG. 8B, the average dimensions of dots in each pattern shape 30X may be different from the average dimensions of dots in each connector 33X.

In the foregoing preferred embodiments, the printer 1 effects two-pass printing. Alternatively, the printer 1 may effect any other suitable type of printing. The printer 1 may effect, for example, four-pass printing, eight-pass printing, or sixteen-pass printing.

In the foregoing preferred embodiments, the nozzle rows 13A of the head portions 12C, 12M, 12Y, 12K, 12W, and 12CL have identical lengths (or each have the length L1) in the sub-scanning direction X. Alternatively, the nozzle rows 13A of the head portions 12C, 12M, 12Y, 12K, 12W, and 12CL may have different lengths in the sub-scanning direction X. In one example, some or all of the nozzle rows 13A of the head portions 12C, 12M, 12Y, 12K, and 12W may be different in length in the sub-scanning direction X. In another example, the nozzle rows 13A of the head portions 12C, 12M, 12Y, 12K, and 12W may be different in length from the nozzle rows 13A of the head portions 12CL. In still another example, at least one of the nozzle rows 13A of the head portions 12CL may be longer in length than the nozzle rows 13A of the head portions 12C, 12M, 12Y, 12K, and 12W.

In the foregoing preferred embodiments, the carriage 10 moves in the main scanning direction Y, and the recording medium 2 moves in the sub-scanning direction X. Alternatively, the carriage 10 and the recording medium 2 may move in any other suitable directions. Because the carriage 10 and the recording medium 2 are required to move relative to each other, either one of the carriage 10 and the recording medium 2 may move in the main scanning direction Y or the sub-scanning direction X. In one example, the recording medium 2 may be placed so as to be immovable, and the carriage 10 may be able to move in both of the main scanning direction Y and the sub-scanning direction X. In another example, both of the carriage 10 and the recording medium 2 may be able to move in both of the main scanning direction Y and the sub-scanning direction X.

In the foregoing preferred embodiments, the printer 1 has been described as being a "shuttle printer" or a "serial printer" that includes the ink head 12 mounted on the carriage 10 and effects printing while the ink head 12 reciprocates (or shuttles) in the main scanning direction Y. Alternatively, the printer 1 may be any other suitable type of printer. The techniques disclosed herein are similarly usable for a "line printer" that includes, for example, a line head similar in width to the recording medium 2 and effects printing, with the line head being fixed.

The techniques disclosed herein are usable for various types of inkjet printers. The techniques disclosed herein are usable not only for the "roll-to-roll" printer 1 that conveys the recording medium 2 in a roll form as illustrated in the foregoing preferred embodiments but also for a flatbed printer. The printer 1 does not necessarily have to be used solely as an independent printer but may be used in combination with other apparatus(es). The printer 1 may include, for example, a cutting apparatus or may be incorporated into other apparatus(es).

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer comprising:

an ink head including nozzles to discharge photo-curable ink onto a recording medium;

a light applicator to apply light to the photo-curable ink discharged onto the recording medium;

a carriage equipped with the ink head;

a mover to move either one of the carriage and the recording medium relative to the other one of the carriage and the recording medium in a first direction; and a controller to control the ink head, the light applicator, and the mover; wherein the nozzles include:

first nozzles to discharge colored photo-curable ink; and second nozzles to discharge transparent photo-curable ink;

the ink head includes:

a colored ink nozzle group in which the first nozzles are provided along a second direction perpendicular or substantially perpendicular to the first direction; and a transparent ink nozzle group in which the second nozzles are provided along the second direction;

the controller includes a first discharge controller configured or programmed to, when either one of the carriage and the recording medium makes a single movement from one side to the other side in the first direction, cause the colored ink nozzle group to discharge the colored photo-curable ink onto a predetermined region while causing the transparent ink nozzle group to discharge the transparent photo-curable ink onto the predetermined region so as to form a colored image and a texture image, the texture image including the colored photo-curable ink and the transparent photo-curable ink that overlap with each other, and the texture image is formed by the first discharge controller selectively forming irregularities on the colored image in the predetermined region.

2. The inkjet printer according to claim 1, wherein the controller is configured or programmed to move either one of the carriage and the recording medium in the first direction more than once over a target region on the recording medium so as to form the texture image including the colored photo-curable ink and the transparent photo-curable ink that are mixed in a direction of thickness of the texture image.

3. The inkjet printer according to claim 1, wherein the first discharge controller is configured or programmed to control the ink head such that the photo-curable ink is discharged from the nozzles included in regions of the colored ink nozzle group and the transparent ink nozzle group located at corresponding positions in the second direction.

4. The inkjet printer according to claim 1, wherein the first discharge controller is configured or programmed to control the ink head such that an amount of the transparent photo-curable ink to be discharged from each of the second nozzles included in the transparent ink nozzle group is larger than an amount of the colored photo-curable ink to be discharged from each of the first nozzles included in the colored ink nozzle group.

5. The inkjet printer according to claim 1, wherein the colored ink nozzle group includes a first colored ink nozzle group in which nozzles to discharge the photo-curable ink of a first color are in alignment with each other in the second direction; and a number of transparent ink nozzle groups is larger than a number of first colored ink nozzle groups.

6. The inkjet printer according to claim 5, wherein the first color is any one of process colors.

7. The inkjet printer according to claim 1, wherein the ink head includes:

a hollow case body in which the nozzles are defined;

a pressure chamber which is defined in the case body, which is in communication with the nozzles, and in which the photo-curable ink is stored;

a diaphragm inside the case body and defining at least a portion of the pressure chamber; and a piezoelectric element connected to the diaphragm to, upon receiving a driving pulse, cause the pressure chamber to expand or contract;

the first discharge controller includes a storage to store:

a first driving pulse to cause each of the nozzles to discharge the photo-curable ink by a first discharge amount; and a second driving pulse to cause each of the nozzles to discharge the photo-curable ink by a second discharge amount larger than the first discharge amount; and the first discharge controller is configured or programmed to supply the first driving pulse to the colored ink nozzle group and supply the second driving pulse to the transparent ink nozzle group.

8. The inkjet printer according to claim 1, wherein an arithmetic average roughness of the texture image is greater than a maximum height of a roughness of the colored image.

* * * * *